(12) United States Patent
Bi

(10) Patent No.: US 11,836,077 B2
(45) Date of Patent: Dec. 5, 2023

(54) DYNAMICALLY TUNING HOST PERFORMANCE BOOSTER THRESHOLDS

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/050,237

(22) PCT Filed: Sep. 1, 2020

(86) PCT No.: PCT/CN2020/112827
§ 371 (c)(1),
(2) Date: Oct. 23, 2020

(87) PCT Pub. No.: WO2022/047619
PCT Pub. Date: Mar. 10, 2022

(65) Prior Publication Data
US 2023/0229590 A1    Jul. 20, 2023

(51) Int. Cl.
*G06F 12/02* (2006.01)
*G06F 3/06* (2006.01)
(52) U.S. Cl.
CPC .......... *G06F 12/0292* (2013.01); *G06F 3/061* (2013.01); *G06F 3/0634* (2013.01); *G06F 3/0659* (2013.01); *G06F 3/0679* (2013.01)
(58) Field of Classification Search
CPC .... G06F 12/0292; G06F 3/061; G06F 3/0634; G06F 3/0659; G06F 3/0679
See application file for complete search history.

(56) References Cited

U.S. PATENT DOCUMENTS

| 2014/0089576 A1* | 3/2014 | Bains ................ G11C 11/40622 |
| | | 711/E12.001 |
| 2015/0242131 A1* | 8/2015 | Nakamura ............ G06F 3/0659 |
| | | 711/112 |

(Continued)

FOREIGN PATENT DOCUMENTS

| CN | 109144888 A | 1/2019 |
| CN | 111414133 A | 7/2020 |

OTHER PUBLICATIONS

ISA/CN, International Search Report and Written Opinion of the International Searching Authority, App. No. PCT/CN2020/112827, dated Apr. 25, 2021, National Intellectual Property Administration, 6 Xitcucheng Rd., Jimen Bridge, Haidian District, Beijing, 9 pgs.

*Primary Examiner* — Masud K Khan
(74) *Attorney, Agent, or Firm* — Holland & Hart LLP

(57) ABSTRACT

Methods, systems, and devices for dynamically tuning host performance booster thresholds are described. A memory system may include a set of memory devices and an interface configured to communicate commands with a host system coupled with the memory system. The interface may communicate commands to the memory system according to a first command mode associated with a logical address space including a plurality of regions and communicate commands according to a second command mode associated with physical memory address. The memory system may further include a controller that may determine a region activated for the second command mode, receive a first plurality of commands, determine, upon deactivating the region, a first threshold based on a first quantity of read commands serviced according to the second command mode. The controller may activate the region for the second command based on a second quantity of read commands received exceeding the first threshold.

25 Claims, 8 Drawing Sheets

(56) References Cited

U.S. PATENT DOCUMENTS

| | | | |
|---|---|---|---|
| 2016/0357478 A1* | 12/2016 | Myrick | G06F 3/0632 |
| 2017/0199672 A1 | 7/2017 | Ryu et al. | |
| 2019/0121558 A1 | 4/2019 | Lee et al. | |
| 2019/0347010 A1 | 11/2019 | Frolikov | |
| 2022/0012174 A1* | 1/2022 | Seok | G06F 3/061 |
| 2022/0108167 A1* | 4/2022 | Upadhyay | G06F 3/061 |

* cited by examiner

DYNAMICALLY TUNING HOST PERFORMANCE BOOSTER THRESHOLDS

CROSS REFERENCE

The present Application for Patent is a 371 national phase filing of International Patent Application No. PCT/CN2020/112827 by BI et al., entitled "DYNAMICALLY TUNING HOST PERFORMANCE BOOSTER THRESHOLDS," filed Sep. 1, 2020, assigned to the assignee hereof, and expressly incorporated by reference herein.

BACKGROUND

The following relates generally to one or more memory systems and more specifically to dynamically tuning host performance booster thresholds.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), 3-dimensional cross-point memory (3D cross point), not-or (NOR), and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
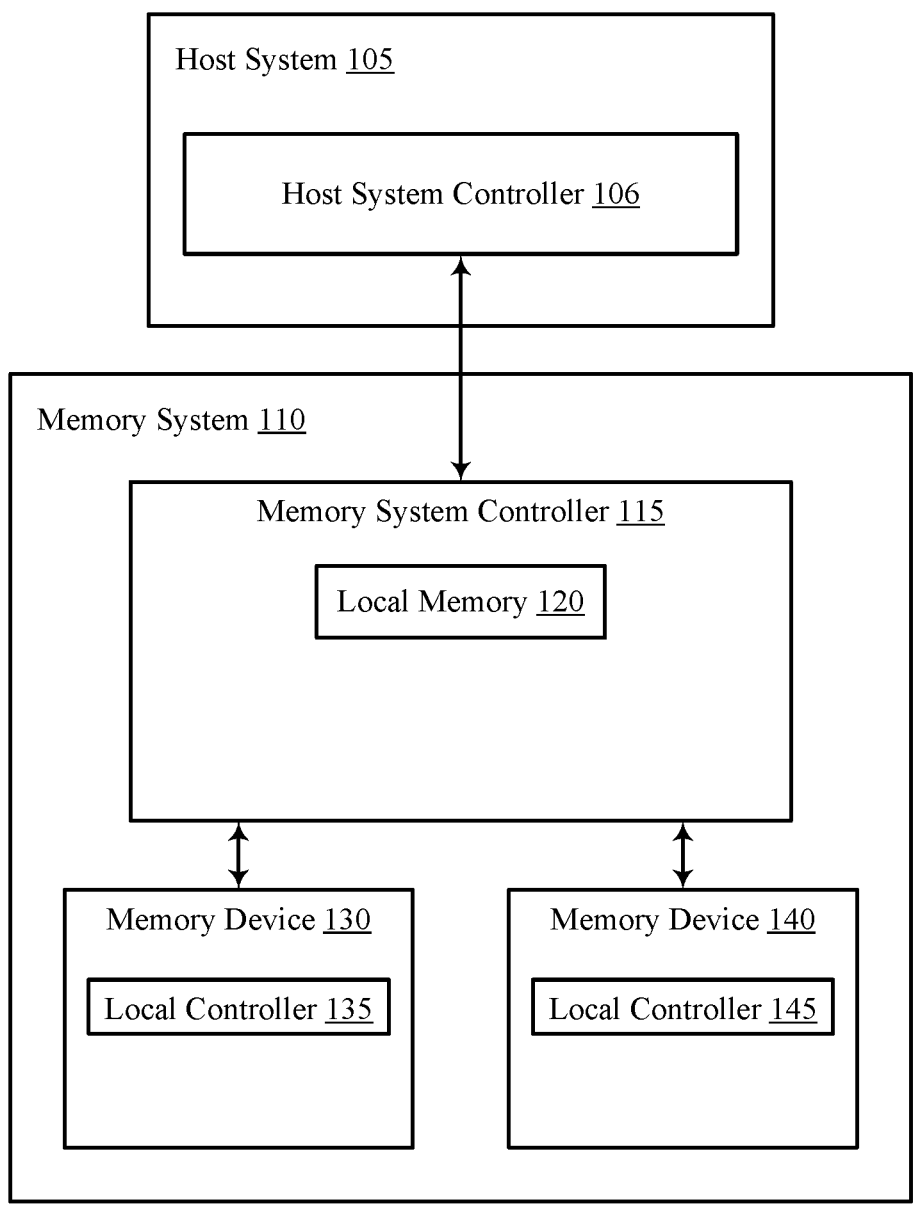
FIG. 1 illustrates an example of a system that supports dynamically tuning host performance booster thresholds in accordance with examples as disclosed herein.

A memory system may perform access operations (e.g., read, write, refresh operations) based on access commands received from a host system coupled with the memory system. In some examples, the memory system may perform address translations between logical addressing associated with the access command received from the host system and physical addressing associated with a memory device in the memory system. A controller in the memory system may maintain a table (e.g., a logical to physical table (L2P)) that has a complete mapping between all logical addresses and physical addresses. In some examples, the memory system may include a capability of performing memory access operations using device-mapped addressing, which may be known as a host performance booster (HPB) mode of operation. The host system may have a plurality of regions in a logical address space of the host system. The memory system may generally activate the HPB on a per region basis when a quantity of read commands associated with the region satisfies an activation threshold value. For regions activated for HPB operation, the memory system may send corresponding portions of the L2P table to the host system. By receiving the L2P tables, the host system may perform the logical to physical addressing translations for read commands which may reduce the read latency as compared with the memory system performing the logical to physical addressing translation for each read command received.

In some examples, the host system may initiate a write command or a map command corresponding to the region activated for the HPB. When the memory system executes the write or map command, the physical addresses associated with the L2P table of the region may be modified at the memory system. That is, the write command or map command may change a physical address in the L2P table at the memory system. In some examples, after enough of the L2P table is modified to satisfy a deactivation threshold, the region at the host system may be deactivated. The memory system may then send the L2P table again when the region satisfies the threshold to be activated. In some examples, the memory system may have a relatively high latency while sending portions of the L2P table to the host system each time a given region is activated. The operations associated with the regions may be highly variable. That is, one region may be associated with many read commands without operations that modify the L2P table (e.g., write commands or map commands), while another region may have a substantially higher quantity of operations that modify the L2P table. The memory system may consume additional resources sending the L2P tables frequently to regions that are activated and deactivated frequently causing the HPB performance to be highly variable.

Systems, devices, and techniques are described herein for determining dynamic thresholds for activation and deactivation of each region for HPB operation. The memory system or host system may determine a dynamic activation threshold for a region based on a last HPB hit ratio—e.g., the quantity of read commands serviced using the HPB the last time a region was active compared with all read commands serviced during the last time the region was active. For example, the memory system or host system may set a relatively high activation threshold when the HPB hit ratio is low—e.g., the quantity of read commands serviced using the HPB is low. Additionally, the memory system or the host system may determine the dynamic activation threshold based on a free HPB buffer space—e.g., the maximum quantity of regions that may concurrently support HPB less the quantity of regions currently active. Additionally or alternatively, the memory system or host system may determine a dynamic deactivation threshold based on the current HPB hit ratio as well as the free HPB buffer space. For example, the memory system or host system may set a relatively high deactivation threshold when the current HPB hit ratio is high—e.g., the quantity of read commands serviced using the HPB while the region is currently active is high. By dynamically tuning the activation and deactivation thresholds, the memory system may avoid frequently sending an L2P table to the host and reduce overall latency of the memory system.

Features of the disclosure are initially described in the context of systems, devices, and circuits as described with reference to FIG. 1. Features of the disclosure are described in the context logical unites and process flow diagrams as described with reference to FIGS. 2-4. These and other features of the disclosure are further illustrated by and described with reference to an apparatus diagram and flowcharts that relate to dynamically tuning host performance booster thresholds as described with reference to FIGS. 5-8.

FIG. 1 is an example of a system 100 that supports dynamically tuning host performance booster thresholds in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., PCIe controller, SATA controller). The host system 105 may use the memory system 110, for example, to write data to the memory system 110 and read data from the memory system 110. Although one memory system 110 is shown in FIG. 1, it is to be understood that the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a serial advanced technology attachment (SATA) interface, a UFS interface, an eMMC interface, a peripheral component interconnect express (PCIe) interface, USB interface, Fiber Channel, Small Computer System Interface (SCSI), Serial Attached SCSI (SAS), Double Data Rate (DDR), a dual in-line memory module (DIMM) interface (e.g., DIMM socket interface that supports DDR), Open NAND Flash Interface (ONFI), Low Power Double Data Rate (LPDDR). In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 or memory device 140 included in the memory system 110, or via a respective physical host interface for each type of memory device 130 or memory device 140 included in the memory system 110.

Memory system 110 may include a memory system controller 115, a memory device 130, and a memory device 140. A memory device 130 may include one or more memory arrays of a first type of memory cells (e.g., a type of non-volatile memory cells), and a memory device 140 may include one or more memory arrays of a second type of memory cells (e.g., a type of volatile memory cells). Although one memory device 130 and one memory device 140 are shown in the example of FIG. 1, it is to be understood that memory system 110 may include any quantity of memory devices 130 and memory devices 140, and that, in some cases, memory system 110 may lack either a memory device 130 or a memory device 140.

The memory system controller 115 may be coupled with and communicate with the host system 105 (e.g., via the physical host interface), and may be an example of a control component configured to cause the memory system 110 to perform various operations in accordance with examples as described herein. The memory system controller 115 may also be coupled with and communicate with memory devices 130 or memory devices 140 to perform operations such as reading data, writing data, erasing data, or refreshing data at a memory device 130 or a memory device 140, and other such operations, which may generically be referred to as access operations. In some cases, the memory system controller 115 may receive commands from the host system 105 and communicate with one or more memory devices 130 or memory devices 140 to execute such commands (e.g., at memory arrays within the one or more memory devices 130 or memory devices 140). For example, the memory system controller 115 may receive commands or operations from the host system 105 and may convert the commands or operations into instructions or appropriate commands to achieve the desired access of the memory devices 130 or memory devices 140. And in some cases, the memory system controller 115 may exchange data with the host system 105 and with one or more memory devices 130 or memory devices 140 (e.g., in response to or otherwise in association with commands from the host system 105). For example, the memory system controller 115 may convert responses (e.g., data packets or other signals) associated with the memory devices 130 or memory devices 140 into corresponding signals for the host system 105.

The memory system controller 115 may be configured for other operations associated with the memory devices 130 or memory devices 140. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical devices, physical block addresses, device physical addresses) associated with memory cells within the memory devices 130 or memory devices 140.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored to the local memory 120 when read from or written to a memory device 130 or memory device 140, and may be available within the local memory 120 for subsequent retrieval for or manipulation (e.g., updating) by the host system 105 (e.g., with reduced latency relative to a memory device 130 or memory device 140) in accordance with a cache policy.

Although the example of memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135 or local controllers 145, which may be internal to memory devices 130 or memory devices 140, respectively, to perform the functions ascribed herein to the memory system controller 115. In general, one or more functions ascribed herein to the memory system controller 115 may in some cases instead be performed by the host system 105, a local controller 135, or a local controller 145, or any combination thereof.

A memory device 140 may include one or more arrays of volatile memory cells. For example, a memory device 140 may include random access memory (RAM) memory cells, such as dynamic RAM (DRAM) memory cells and synchronous DRAM (SDRAM) memory cells. In some examples, a memory device 140 may support random access operations (e.g., by the host system 105) with reduced latency relative to a memory device 130, or may offer one or more other performance differences relative to a memory device 130.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), and electrically erasable programmable ROM (EEPROM).

In some examples, a memory device 130 or a memory device 140 may include (e.g., on a same die or within a same package) a local controller 135 or a local controller 145, respectively, which may execute operations on one or more memory cells of the memory device 130 or the memory device 140. A local controller 135 or a local controller 145 may operate in conjunction with a memory system controller 115 or may perform one or more functions ascribed herein to the memory system controller 115. In some cases, a memory device 130 or a memory device 140 that includes a local controller 135 or a local controller 145 may be referred to as a managed memory device and may include a memory array and related circuitry combined with a local (e.g., on-die or in-package) controller (e.g., local controller 135 or local controller 145). An example of a managed memory device is a managed NAND (MNAND) device.

In some cases, the host system may include a plurality of regions in a logical space of the host system. In some cases, L2P tables may be maintained and data may be marked as valid or invalid at a sub-region level of granularity, and an L2P table associated with a region may contain valid data, invalid data, or no data. Invalid data may be data that is outdated due to a more recent or updated version of the data being stored in a different physical address of the memory device 130. For example, data may be come invalid when the host system initiates a write command, a map command, or a garbage collection operation. Invalid data have been previously programmed to the memory device 130 but may no longer be associated with a valid logical address, such as a logical address referenced by the host system 105. Valid data may be the most recent version of such data being stored on the memory device 130.

In some cases, a memory system controller 115, a local controller 135, or a local controller 145 may perform operations (e.g., as part of one or more media management algorithms) for a memory device 130 or a memory device 140, such as wear leveling, background refresh, garbage collection, scrub, block scans, health monitoring, or others, or any combination thereof. For example, within a memory device 130 or region of the memory device 130, there may be valid data and invalid data. To avoid waiting for all of the data in the region or memory device 130 to be invalid, an algorithm referred to as "garbage collection" may be invoked to allow portions of the memory device 130 to be erased and released as a free block for subsequent write operations. Garbage collection may refer to a set of media management operations that include, for example, selecting a portion of the memory device 130 that contains valid and invalid data, copying the valid data from the selected portions to new locations (e.g., free portions in the memory device 130), marking the data in the previously selected portion as invalid, and erasing the selected portion of the memory device 130. As a result, additional space is available in the memory system to store subsequent data (e.g., data subsequently received from the host system 105).

In some examples, the memory system 110 may include a capability of performing operations using a HPB. The memory system 110 or host system 105 may activate the HPB on a per region basis. In examples where the host system 105 activates the HPB, the host system 105 may request information from the memory system 110. In other examples when the host system 105 activates the HPB, the memory system 110 may be configured to send the host system information based on an event occurring (e.g., an L2P table modification, a garbage collection operation, a change in a value used by the host system 105 to activate a region). The memory system 110 or host system 105 may also deactivate HPB on a per region basis when the L2P table associated with the region at the memory device is modified to cause a high quantity of inconsistent information to be stored in the L2P table at the host system 105. In some cases, each region may utilize the same activation and deactivation threshold. In such examples, though, some regions may utilize HPB to execute most of the read commands associated with the given region, while other regions may frequently experience their L2P table being modified. Thus, a memory system 110 may consume additional resources sending the L2P table a high quantity of times to regions that are activated and deactivated quite frequently.

As described herein, the host system 105 or memory system 110 may determine dynamic thresholds for activation and deactivation of each region during the HPB. For example, a region may have an activation threshold determined based on a last HPB hit ratio and a free HPB buffer value as described with reference to FIG. 3. In other examples, a region may have a deactivation threshold determined based on a current HPB hit ratio and a free HPB buffer value as described with reference to FIG. 4. By determining the activation and deactivation thresholds dynamically, a memory system 110 may avoid sending the L2P table to the host system 110 frequently and reduce the overall latency of the system.

The system 100 may include any quantity of non-transitory computer readable media that support dynamically tuning host performance booster thresholds. For example, the host system 105, the memory system controller 115, a memory device 130, or a memory device 140 may include or otherwise may access one or more non-transitory computer readable media storing instructions (e.g., firmware) for performing the functions ascribed herein to the host system 105, memory system controller 115, memory device 130, or memory device 140. For example, such instructions, when executed by the host system 105 (e.g., by the host system controller 106), by the memory system controller 115, by a memory device 130 (e.g., by a local controller 135), or by a memory device 140 (e.g., by a local controller 145), may cause the host system 105, memory system controller 115, memory device 130, or memory device 140 to perform one or more associated functions as described herein.

Figure 2:
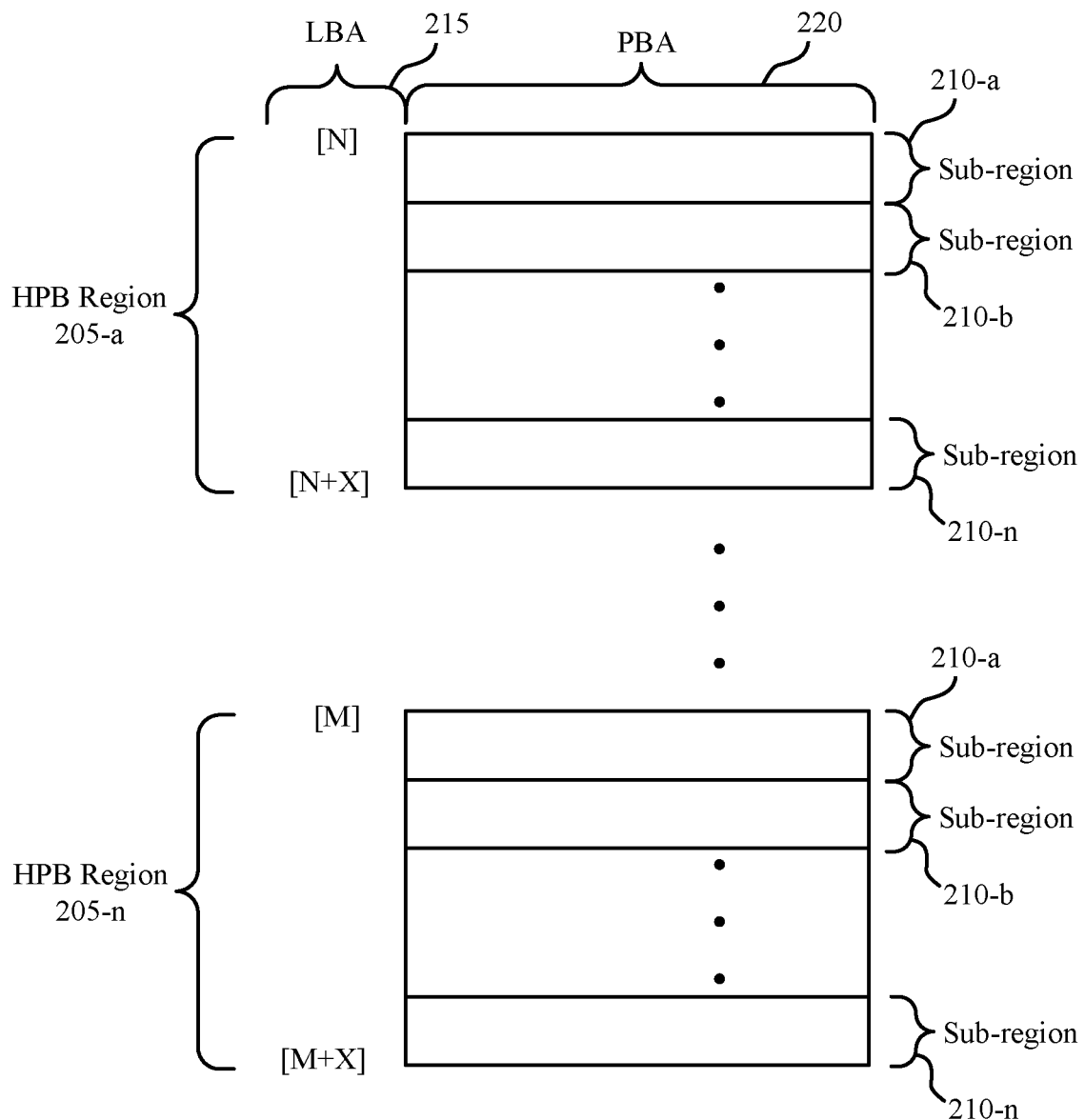
FIG. 2 illustrates an example of a logical unit that supports dynamically tuning host performance booster thresholds in accordance with examples as disclosed herein.

FIG. 2 illustrates an example of a logical unit 200 that supports dynamically tuning host performance booster thresholds in accordance with examples as disclosed herein. The logical unit 200 may be associated with a logical space in a host system (e.g., host system 105 as described with reference to FIG. 1). The host system may have one or more logical units 200 in the logical space.

In some examples, each logical unit 200 may include regions 205. Each region 205 may be configured to be activated and deactivated based on an activation and deactivation threshold. In some examples, there may be a maximum quantity of regions 205 that may be activated concurrently. A quantity of regions 205 that can be maintained at a host system may be determined by a quantity of storage space for a logical space associated with HPB in the host system. Additionally, a quantity of regions 205 that may still be activated (e.g., the maximum quantity of regions 205 less the quantity of regions 205 already active) may be referred to as a free HPB buffer value. When a region 205 is activated, the region 205 may be configured to store (e.g., as a cache) an L2P table received from a memory system (e.g., a memory system 110 as described with reference to FIG. 1). That is, a table location for a region 205 may be associated with an L2P table (or a portion of an L2P table) and receive the L2P table when activated. Thus, the host system may translate from logical addressing to physical addressing for read commands when the region is activated. When a region 205 is considered deactivated, the host system may be configured to refrain from performing any L2P translations and the address translation may occur at the memory system. Each region 205 may be associated with a range of LBAs 215. In some cases, the range of LBAs 215 within a region 205 or sub-region 210 may be contiguous. The logical unit 200 may contain physical addresses 220 (e.g., physical block addresses (PBAs)) for each LBA 215. Physical addresses 220 may correspond to physical addressing within a memory system, and thus may be used for HPB commands to the memory system.

Additionally, each region 205 may also include a plurality of sub-regions 210. In some examples, the size of a sub-region 210 may be specified by a parameter of a geometry descriptor. Each sub-region 210 may also be configured to be activated or deactivated. That is, a sub-region 210-a may be activated and store a portion of an L2P table while other sub-regions 210 in region 205-a may be deactivated. In some examples, a region 205 may be considered activated if at least one sub-region 210 is activated.

In some examples, the memory system may receive a first plurality of read commands from the host system and execute read operations based on the read commands received. In some examples, the memory system may translate the logical address associated with the read command into a physical address associated with a memory device (e.g., memory device 130 or 140 as described with reference to FIG. 1). In some cases, the memory system may also be capable of utilizing an HPB. In such examples, the memory system may activate a region 205 based on an activation threshold. When the region 205 is activated, either the host system may request the L2P table or the memory system may initiate a transfer of the L2P table to the activated region 205. Thus, the host system may perform the logical addressing to physical addressing at the region 205 and send a read command to the memory system that includes a physical address. The memory system may reduce latencies by receiving the physical address rather than having to translate from a logical address to a physical address.

In some examples, the host system may initiate a write operation or a mapping operation at the memory system and modifying the addresses of the L2P table stored in the activated region 205. As the memory system may update L2P tables, the L2P table stored at the region 205 may have portions that are invalidated by the write or map operations. For example, the host system may initiate a write operation on a logical address and cause new data to be written to a new physical address at the memory system. The memory system may update the corresponding L2P table based on the new data that is written but the L2P table stored at the corresponding region 205 may have the physical address 220 associated with the new data become invalid. When enough of the L2P table stored at the region 205 is invalidated (e.g., the region 205 satisfies a deactivation threshold) the region 205 may be deactivated and the L2P table stored at the region 205 may be refrained from being used.

In some examples, sending the L2P table from the memory system to the host system for a region 205 may involve a relatively high latency and consume memory system resources. Thus, to reduce frequently sending an L2P table for a region 205, dynamic activation and deactivation thresholds may be implemented for each region 205 as described herein. That is, region 205-a may have different activation and deactivation thresholds than region 205-n. Additionally or alternatively, the activation and deactivation thresholds for region 205-a may change based on certain parameters. For example, the region 205 may have an activation threshold determined based on a last HPB hit ratio and a free HPB buffer value as described with reference to FIG. 3. That is, as more regions are available to be activated and a region is associated with a relatively high quantity of read commands serviced using HPB, the memory system or host system may determine a relatively low activation threshold so the region may quickly be activated and utilize HPB. Thus, a memory system may receive the first plurality of read commands, deactivate the region, and determine an activation threshold based on the last HPB hit ratio while the region was last activated. The memory system may then utilize the activation threshold when a second plurality of read commands are received and a count of the second plurality of read commands exceeds the activation threshold. That is, the activation threshold may be a quantity that the memory system compares with the quantity of read commands received at a deactivated region. In some examples, when the region 205 is reactivated (e.g., activated again), the region 205 may receive an updated L2P table from the memory system.

In other examples, the region 205 may have a deactivation threshold determined based on a current HPB hit ratio and a free HPB buffer value as described with reference to FIG. 4. That is, as more regions are available to be activated and a region is associated with a relatively high quantity of read commands serviced using HPB, the memory system or host system may determine a relatively high deactivation threshold as the region does not experience frequent L2P table updates and utilizes the HPB quite frequently. The memory system may receive a set of read commands while the region is activated and determine a first quantity of read commands serviced using HPB and a second quantity of read commands executed normally (e.g., where the memory system performs the L2P translation) as described with reference to FIG. 4.

Additionally or alternatively, determining the dynamic activation and deactivation thresholds for a region 205 may be performed in any system (e.g., system 100 as described with reference to FIG. 1) that has a host system capable of storing the L2P tables sent by a memory system. That is, these techniques may be implemented in memory systems having non-volatile memory. Additionally, either the memory system or host system may determine the thresholds. In examples where the host system determines the threshold, the host system may request information from the memory system (e.g., L2P table modifications).

Figure 3:
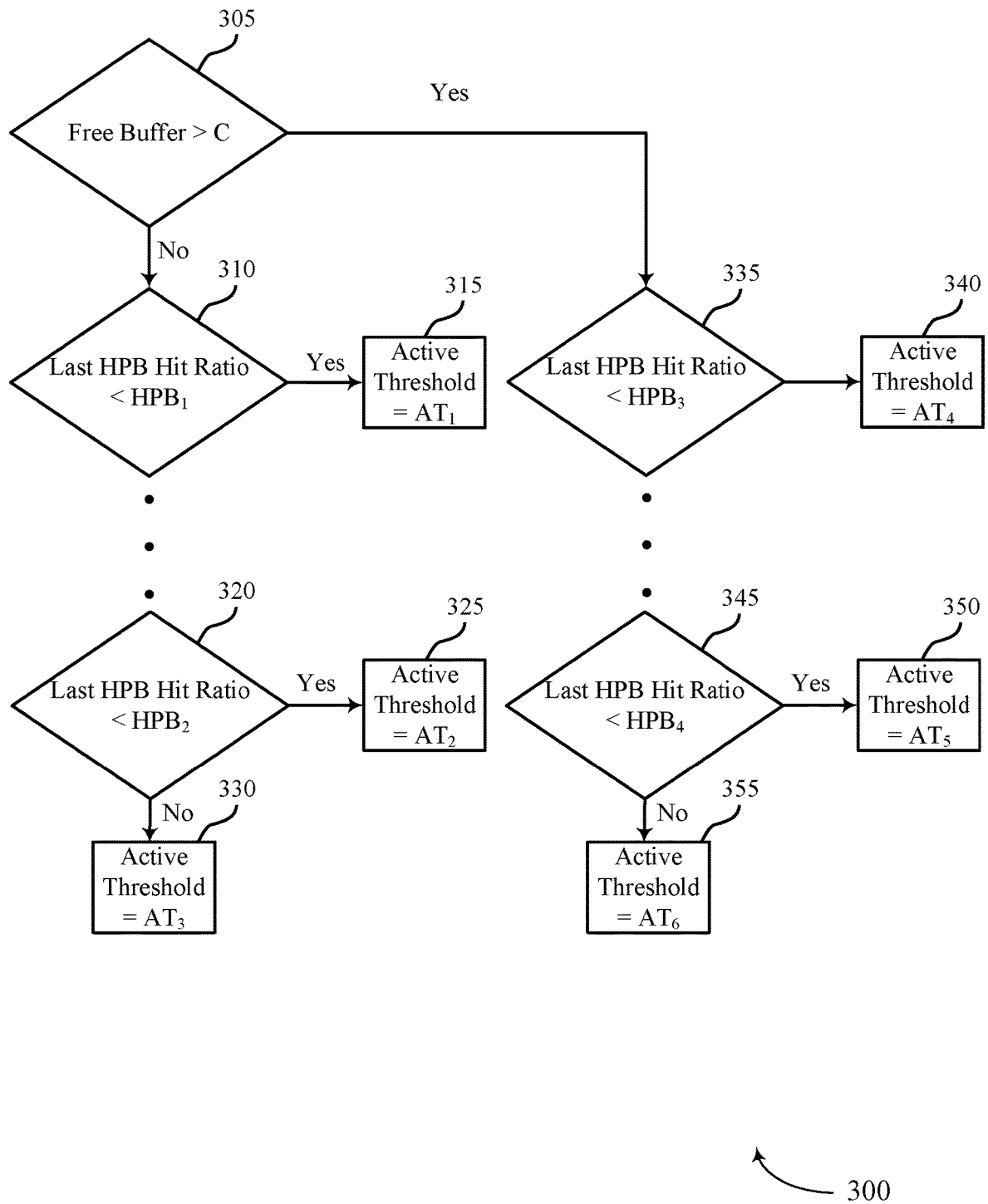
FIG. 3 illustrates an example of a process flow diagram that supports dynamically tuning host performance booster thresholds in accordance with examples as disclosed herein.

FIG. 3 illustrates an example of a process flow diagram 300 that supports dynamically tuning host performance booster thresholds in accordance with examples as disclosed herein. The process flow diagram 300 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the process flow diagram 300 may be performed by a system (e.g., system 100) as described with reference to FIG. 1. For example, the process flow diagram 300 may be performed by a host system (e.g., host system 105 as described with reference to FIG. 1) and a memory system (e.g., memory system 110 as described with reference to FIG. 2). In some examples, a memory system may execute a set of codes to control the functional elements of the memory device to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

At 305, the quantity of free HPB buffers may be determined and compared with a predetermined value C. For example, the memory system or the host system may determine the quantity of free HPB buffers. The quantity of free HPB buffers may be determined at a memory system controller (e.g., memory system controller 115 as described with reference to FIG. 1) or a host system controller (e.g., host system controller 106 as described with reference to FIG. 1). In some examples, the quantity of free HPB buffers may be the maximum quantity of regions (e.g., regions 205 as described with reference to FIG. 2) that may concurrently support HPB less the quantity of regions currently active. In some cases, the predetermined value C may depend on the maximum quantity of regions. For example, the predetermined value C maybe a fourth (¼) or a half (½) of the maximum quantity of regions that may concurrently support HPB. It is to be understood that these and any other specific numeric examples herein are merely examples provided solely for clarity in explanation and are not limiting of the claims. Additionally, the memory system or host system may determine higher activation thresholds if the quantity of free HPB buffers fails to satisfy the predetermined value. That is, if a relatively high quantity of regions are already active, the activation threshold may be higher to reduce the likelihood of achieving the maximum quantity of regions that concurrently support HPB (e.g., which may result in frequent region recycling). In other examples, when the quantity of free HPB buffers satisfies the predetermined value, the activation thresholds may be lower as more regions are available to be activated without recycling. If the memory system or host system determine that the quantity of HPB buffers satisfies the predetermined value, the host system or memory system may proceed to block 335. If the memory system or host system determine that the quantity of free HPB buffers fails to satisfy the predetermined value, the host system or memory system may proceed to block 310.

At 310, the last HPB hit ratio may be determined and compared with the value $HPB_1$. For example, the memory system or the host system may determine the last HPB hit ratio and compare it with the value $HPB_1$. In some examples, the last HPB hit ratio may be a quantity of read commands serviced (e.g., by the memory system) using HPB compared with all read commands serviced during the last time the region was active. That is, the memory system may initiate a first counter to an initial value (e.g., one (1)) to track the quantity of read commands serviced using HPB (e.g., receiving a valid physical address in a read command from the host system). When a read command is executed using HPB, the memory system may increment the first counter (e.g., from one (1) to two (2)). In some examples, the memory system may be unable to perform the read command using the HPB. That is, a write command, a map command, or a garbage collection operation issued by the host system may invalidate part of the L2P table stored in the region. In such cases, the memory system may determine the physical address received from the host system is invalid and the memory system may perform the logical to physical addressing translation when performing the read command (e.g., a normal read). The memory system may initiate a second counter to an initial value (e.g., one (1)) and increment the second counter any time a normal read is executed. In examples where the host system is determining the activation thresholds, the host system may request the count information from the memory system. After a region is deactivated, the host system or memory system may determine the last HPB hit ratio by generating a ratio between the first counter value (e.g., the HPB hit count) and the combined value of the first and second counters (e.g., the total read commands executed while the region was active). Additionally, the memory system may reset the first counter and second counter (e.g., reset the count value back to zero (0)) when a give region is deactivated.

After determining the last HPB hit ratio, the host system or memory system may compare the last HPB hit ratio with the value $HPB_1$. In some examples, the value $HPB_1$ may be a predetermined quantity (e.g., 0.5) or percentage (e.g., 50%). If the memory system or host system determine the HPB hit ratio exceeds the value $HPB_1$, the memory system or host system may proceed to block 320. If the host system or memory system determine the HPB hit ratio is lower than the value $HPB_1$, the memory system or host system may proceed to block 315.

At 315, an activation threshold (e.g., $AT_1$) may be determined. For example, the memory system or host system may determine an activation threshold. In some examples, the $AT_1$ threshold may be a numerical value (e.g., 1024). In some examples, the memory system or host system may use the $AT_1$ threshold to activate the region after the region is deactivated. That is, the memory system may initiate a third counter to keep track of the read commands executed associated with the deactivated region—e.g., the counter may be incremented by a value one (1) each time a read command associated with a deactivated region is executed. In some examples, when a count value of the third counter satisfies the $AT_1$ threshold, the memory system or host system may activate the region. In examples where the host system activates the region, the host system may request the count value of the third counter. In other examples where the host system activates the region, the memory system may be configured send the count value of the third counter to the host system.

The last HPB hit ratio may be determined and compared with additional values to determine one or more additional thresholds. For example, at 320, the last HPB hit ratio may be determined and compared with the value $HPB_2$. For example, the memory system or the host system may determine the last HPB hit ratio and compare it with the value $HPB_2$. In some examples, the value $HPB_2$ may be a higher quantity or percentage than the value $HPB_1$. For example, the value $HPB_2$ may be 0.8 or 80%. Additionally or alternatively, the memory system or host system may compare the last HPB hit ratio with a value between $HPB_1$ and $HPB_2$. That is, a quantity of values or percentages may be compared with the last HPB hit ratio between blocks 310 and 320 (e.g., 55%, 60%, 65%, etc.). In such examples, the memory system or host system may determine an activation threshold between $AT_1$ and $AT_2$ if the last HPB hit ratio satisfies the value between $HPB_1$ and $HPB_2$. If the memory system or host system determine the HPB hit ratio exceeds the value $HPB_2$, the memory system or host system may proceed to block 330. If the host system or memory system determine the HPB hit ratio is lower than the value $HPB_2$, the memory system or host system may proceed to block 325.

At 325, an activation threshold (e.g., $AT_2$) may be determined. For example, the memory system or host system may determine an activation threshold. In some examples, the $AT_2$ threshold may be a numerical value (e.g., 256). In some cases, the $AT_2$ threshold may be lower than the $AT_1$ threshold. That is, as the last HPB hit ratio approaches one (1), the memory system and host system may set lower activation thresholds. In some examples, a high HPB hit ratio (e.g., 95%) may indicate that a region is primarily associated with read commands and does not frequently update the L2P table and the memory system or host system may accordingly activate the region quickly to reduce read latencies as described with reference to FIG. 2.

At 330, an activation threshold (e.g., $AT_3$) may be determined. For example, the memory system or host system may determine an activation threshold. In some examples, the $AT_3$ threshold may be a numerical value (e.g., 128). In some cases, the $AT_3$ threshold may be lower than the $AT_2$ threshold as the HPB hit ratio is closer to one (1).

At 335, the last HPB hit ratio may be determined and compared with the value $HPB_3$. For example, the memory system or the host system may determine the last HPB hit ratio and compare it with the value $HPB_3$ based on the free HPB buffer value satisfying the predetermined value C. In some examples, the value $HPB_3$ may be the same as the value $HPB_1$. In other examples, the value $HPB_3$ may be different than value $HPB_1$. If the memory system or host system determine the HPB hit ratio exceeds the value $HPB_3$, the memory system or host system may proceed to block 345. If the host system or memory system determine the HPB hit ratio is lower than the value $HPB_3$, the memory system or host system may proceed to block 340.

At 340, an activation threshold (e.g., $AT_4$) may be determined. For example, the memory system or host system may determine an activation threshold. In some examples, the $AT_4$ threshold may be a numerical value (e.g., 512). In some cases, the $AT_4$ threshold may be lower than the $AT_1$ threshold as there are a greater quantity of free HPB buffers and more regions may be activated before the maximum quantity of regions that may concurrently support HPB is achieved.

The last HPB hit ratio may be determined and compared with additional values to determine one or more additional thresholds. For example, at 345, the last HPB hit ratio may be determined and compared with the value $HPB_4$. For example, the memory system or the host system may determine the last HPB hit ratio and compare it with the value $HPB_4$. In some examples, the value $HPB_4$ may be a higher quantity or percentage than the value $HPB_3$. Additionally or alternatively, the memory system or host system may compare the last HPB hit ratio with a value between $HPB_3$ and $HPB_4$. If the memory system or host system determine the HPB hit ratio exceeds the value $HPB_4$, the memory system or host system may proceed to block 355. If the host system or memory system determine the HPB hit ratio is lower than the value $HPB_4$, the memory system or host system may proceed to block 350.

At 350, an activation threshold (e.g., $AT_5$) may be determined. For example, the memory system or host system may determine an activation threshold. In some examples, the $AT_5$ threshold may be a numerical value (e.g., 128). In some cases, the $AT_5$ threshold may be lower than the $AT_4$ threshold as the last HPB hit ratio is closer to one (1).

At 355, an activation threshold (e.g., $AT_6$) may be determined. For example, the memory system or host system may determine an activation threshold. In some examples, the $AT_6$ threshold may be a numerical value (e.g., 64). In some cases, the $AT_6$ threshold may be lower than the $AT_3$ and $AT_5$ thresholds as there are a greater quantity of free HPB buffers and the HPB hit ratio is closer to one (1).

Alternatively, the memory system or host system may determine the activation threshold for a given region using a formula in place of flow diagram 300. In some examples, the memory system or host system may determine the activation threshold by utilizing the following formula; $AT_n = A*(1+8/2^{Last\ Hit\ Count/Last\ Miss\ Count}) + \log_2((\text{Total Active Count}/\text{Average Active Count})+1) - \log_2((\text{Total Hit Count}/\text{Average Hit Count})+1) - \log_2 B/(\text{card denisty}-\text{Max Actvie Region Size})$, where A is the HPB sub region size (e.g., sub-region 210 as described with reference to FIG. 2) divided by a predetermined quantity (e.g., 1024*1024*2) and B is the HPB free buffer count (e.g., the quantity of regions available to activate). In some examples, the value A may also be the minimum activation threshold. In some cases, the last hit count may be the last HPB read count (e.g., the value of the first counter). In some examples, the last miss count may be associated with the quantity of read commands sent by the host system to be serviced according to the HPB but because of a modification (e.g., write command, map command, or garbage collection operation) in the L2P table stored at the region, the read command was executed normally (e.g., the count value of the second counter). In some examples, the total active count may be the quantity of times a given region has been activated. The memory system or host system may increment a fourth counter to track this value (e.g., increment the counter each time a region is activated) and the fourth counter may refrain from being reset. The average active count may be the average quantity of times a region is activated across the plurality of regions. For example, if a first region has a total active count of five (5) and a second region has a total active count of seven (7), the average active count may be six (6). The total hit count is a total quantity of HPB read commands serviced at a given region since the device was initiated and the active hit count may be the average total hit count across the plurality of regions. The memory system may initiate a fifth counter and increment the count value to determine the total hit count value (e.g., increment the counter by a value one (1) each time an HPB read is performed). The total hit count may refrain from being reset. The max active region size may be the maximum quantity of regions that may concurrently support HPB. In some examples, when the host system is determining the activation threshold, the host system may request the count values for the last hit count, last miss count, the total hit count and the average hit count from the memory system.

Figure 4:
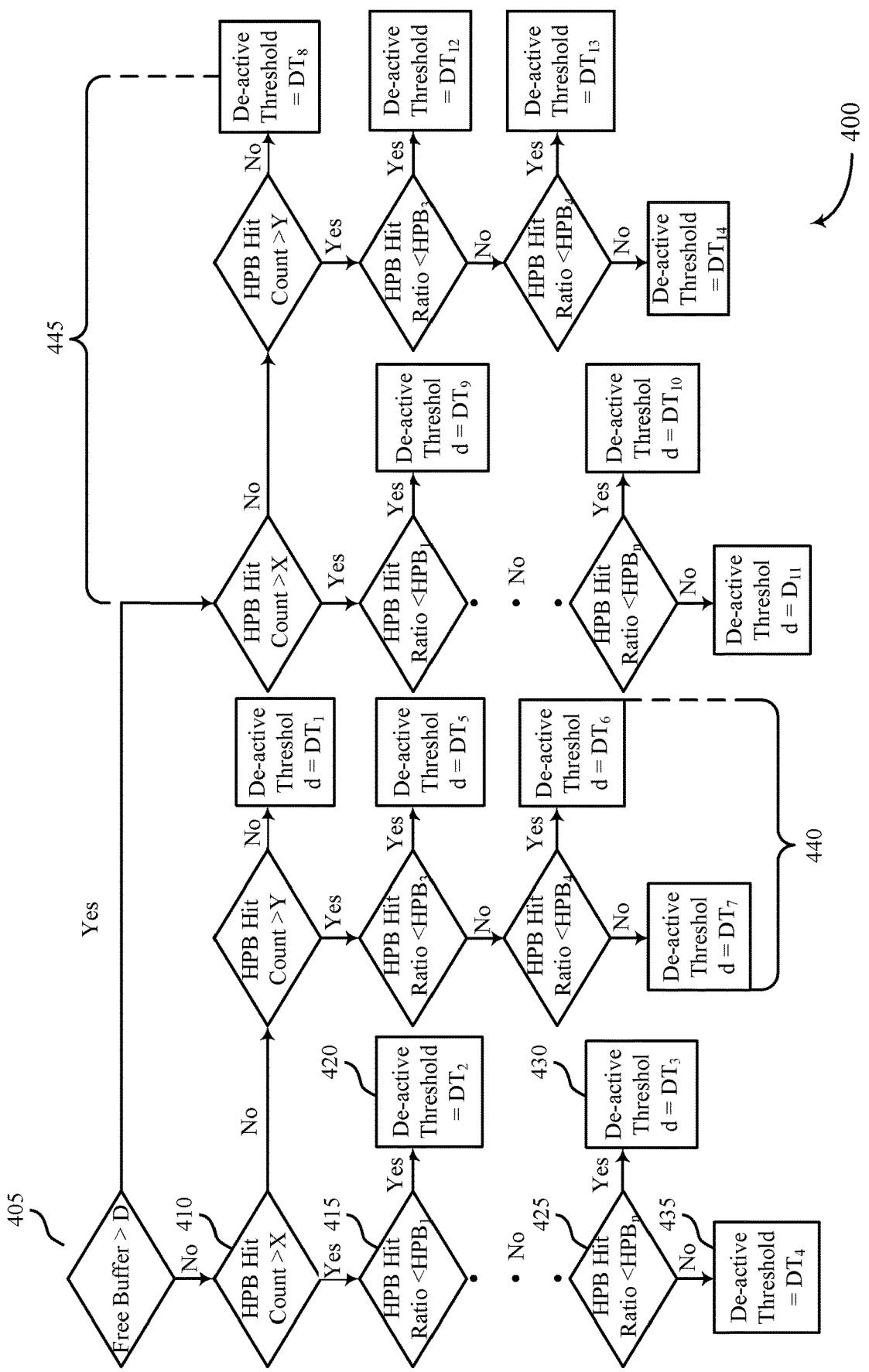
FIG. 4 illustrates an example of a process flow diagram that supports dynamically tuning host performance booster thresholds in accordance with examples as disclosed herein.

FIG. 4 illustrates an example of a process flow diagram 400 that supports dynamically tuning host performance booster thresholds in accordance with examples as disclosed herein. The process flow diagram 400 may be performed by processing logic that may include hardware (e.g., processing system, circuitry, dedicated logic, programmable logic, microcode, hardware of a device, integrated circuit, etc.), software (e.g., instructions run or executed on a processing device), or a combination thereof. In some examples, the process flow diagram 400 may be performed by a system (e.g., system 100) as described with reference to FIG. 1. For example, the process flow diagram 400 may be performed by a host system (e.g., host system 105 as described with reference to FIG. 1) and a memory system (e.g., memory system 110 as described with reference to FIG. 2). In some examples, a memory system may execute a set of codes to control the functional elements of the memory device to perform the functions described below. Although shown in a particular sequence or order, unless otherwise specified, the order of the processes may be modified. Thus, the illustrated examples are used as examples, and the illustrated processes may be performed in a different order, and some processes may be performed in parallel. Additionally, one or more processes may be omitted in various examples. Thus, not all processes are used in every example. Other process flows are possible.

At block 405, the quantity of free HPB buffers may be determined and compared with a predetermined value D (e.g., which may be the same or different than predetermined value C as discussed with reference to FIG. 3). For example, the memory system or the host system may determine the quantity of free HPB buffers. The quantity of free HPB buffers may be determined at a memory system controller (e.g., memory system controller 115 as described with reference to FIG. 1) or a host system controller (e.g., host system controller 106 as described with reference to FIG. 1). In some examples, the memory system or host system may determine a deactivation threshold based at least in part on the quantity of free HPB buffers. That is, in some examples when the quantity of free HPB buffers is relatively low, the deactivation threshold may be lower so that more regions (e.g., regions 205 as described with reference to FIG. 2) may be deactivated and free up additional HPB buffers. In other examples, when the quantity of free HPB buffers is relatively high, the deactivation thresholds may be higher as more regions are available to be activated. If the memory system or host system determine that the quantity of free HPB buffers satisfies the predetermined value D, the host system or memory system may proceed to block 445. If the memory system or host system determine that the quantity of free HPB buffers fails to satisfy the predetermined value, the host system or memory system may proceed to block 410.

At 410, a current HPB hit count may be determined and compared with a predetermined value X. For example, the memory system or host system may determine the current HPB hit count and compare it with the value X. For example, the current HPB hit count may be a quantity of read commands serviced using the HPB while the region is currently activated. The memory system may initiate a first counter to a first value and increment the counter each time a read command is serviced using the HPB. In some examples, the memory system or host system may determine a deactivation threshold based on the HPB hit count. That is, when the current HPB hit count is relatively high, a deactivation threshold may be relatively low because a corresponding region may be associated with a high quantity of read commands serviced using the HPB and the region may benefit from an L2P table update without increasing the latency of the system (e.g., system 100 as described with reference to FIG. 1). In other examples, when the current HPB hit count is relatively low, a deactivation threshold may be relatively high because deactivating the region now may cause an increase in latency if it cycles between being activated and deactivated. Additionally, the predetermined value X may be a predetermined quantity (e.g., 2048). If the memory system or host system determine that the current HPB hit count (e.g., the count value of the first counter) satisfies the value X, the host system or memory system may proceed to block 415. If the memory system or host system determines that the current HPB hit count fails to satisfy the value X the host system or memory system may proceed to block 440.

At block 415, the current HPB hit ratio may be determined and compared with the value $HPB_1$. For example, the memory system or the host system may determine the current HPB hit ratio and compare it with the value $HPB_1$. The current HPB hit ratio may be the HPB hit ratio while a region is activated. The HPB hit ratio may reset when a region is deactivated. In some examples, the value $HPB_1$ may be a predetermined quantity (e.g., 0.5) or percentage (e.g., 50%). If the memory system or host system determine the current HPB hit ratio exceeds the value $HPB_1$, the memory system or host system may proceed to block 425. If the host system or memory system determine the HPB hit ratio is lower than the value $HPB_1$, the memory system or host system may proceed to block 420.

At 420, a deactivation threshold (e.g., $DT_2$) may be determined. For example, the memory system or host system may determine the deactivation threshold. In some examples, the $DT_2$ threshold may be a numerical value (e.g., 32). The deactivation threshold may indicate the quantity of LBAs that may be updated or modified (e.g., due to a write command, map command, garbage collection operation) before the region is deactivated. For example, when the $DT_2$ threshold is 32, it may indicate that after 32 LBAs are modified, the memory system or host system may deactivate the region. The memory system may initiate a second counter to an initial value and increment the counter by a value one (1) each time an LBA is modified. In examples where the host system determines the deactivation threshold, the host system may request the count value of the second counter. The memory system or host system may utilize the deactivation threshold while a region is active. That is, as the memory system receives access commands and modifies the L2P table, the second counter may increment and when the count value of the second counter satisfies the deactivation threshold, the host system or memory system may deactivate the region. When the region is deactivated, the memory system or host system may reactivate the region when the region satisfies the dynamic activation threshold.

At 425, the current HPB hit ratio may be determined and compared with the value $HPB_n$. For example, the memory system or the host system may determine the current HPB hit ratio and compare it with the value $HPB_n$. In some examples, the value $HPB_n$ may be a higher quantity or percentage than the value $HPB_1$. For example, the value $HPB_n$ may be 0.875 or 87.5%. Additionally or alternatively, the memory system or host system may compare the current HPB hit ratio with a value between $HPB_1$ and $HPB_n$. That is, a quantity of values or percentages may be compared with the last HPB hit ratio between blocks 415 and 425 (e.g., 55%, 60%, 65%, etc.). In such examples, the memory system or host system may determine an activation threshold between $DT_2$ and $DT_3$ if the last HPB hit ratio satisfies the value between $HPB_1$ and $HPB_n$. If the memory system or host system determine the HPB hit ratio exceeds the value $HPB_n$, the memory system or host system may proceed to block 435. If the host system or memory system determine the HPB hit ratio is lower than the value $HPB_n$, the memory system or host system may proceed to block 430.

At 430, a deactivation threshold (e.g., $DT_3$) may be determined. For example, the memory system or host system may determine the deactivation threshold. In some examples, the $DT_3$ threshold may be a numerical value (e.g., 2048). In some cases, the $DT_3$ threshold may be higher than the $DT_2$ threshold. That is, as the current HPB hit ratio approaches one (1), the memory system and host system may set higher deactivation thresholds. In some examples, a high HPB hit ratio (e.g., 87.5%) may indicate that a region is primarily associated with read commands and the memory system and host system may wait to deactivate (e.g., keep the region active) the region to reduce latencies associated with activating and deactivating a region frequently as described with reference to FIG. 2.

At block 445, a deactivation threshold (e.g., $DT_1$, $DT_5$, $DT_6$, or $DT_7$) may be determined. For example, the memory system or host system may determine the deactivation threshold. In some cases, the memory system or host system may utilize a process similar to blocks 410-435 to determine a deactivation threshold. For example, if the current HPB hit count exceeds a predetermined value Y, the memory system or host system may compare the current HPB hit ratio with values $HPB_3$ and $HPB_4$ and determine a deactivation threshold $DT_5$ if the current HPB hit ratio is below the value $HPB_3$, determine a deactivation threshold $DT_6$ if the current HPB hit ratio is below the value $HPB_4$, or determine a deactivation threshold $DT_7$ if the current HPB hit ratio exceeds the value $HPB_4$. In some examples, the predetermined value Y may be a quantity (e.g., 1024) that is less than the predetermined value X. Thus, in some examples a current HPB hit ratio at block 440 may cause a higher deactivation threshold than the same respective current HPB hit ratio at blocks 410-435. For example, if the value $HPB_1$ and $HPB_3$ are the same (e.g., 50%), deactivation threshold $DT_5$ may be higher than $DT_2$ as fewer read commands have currently been serviced according to the HPB and deactivating the region now may cause an increase in latencies. In other examples, when the current HPB hit count fails to satisfy the predetermined value Y, the memory system or host system may set a deactivation threshold $DT_1$. In some examples, the deactivation $DT_1$ may be relatively high because a corresponding region may not benefit from frequent L2P table updates since the current HPB hit count is relatively low.

At block 445, a deactivation threshold (e.g., $DT_8$, $DT_9$, $DT_{10}$, $DT_{11}$, $DT_{12}$, $DT_{13}$, or $DT_{14}$) may be determined. For example, the memory system or the host system may determine the deactivation thresholds. In some cases, the memory system or host system may determine the deactivation thresholds utilizing a similar process to blocks 410-440. For example, if the current HPB hit count exceeds the predetermined value X, the memory system or host system may compare the current HPB hit ratio with values $HPB_1$ though HPB$_n$ to determine deactivation thresholds DT$_9$, DT$_{10}$, or DT$_{11}$. In some examples, deactivation thresholds DT$_9$, DT$_{10}$, or DT$_{11}$ may be greater than respective deactivation thresholds DT$_2$, DT$_3$, or DT$_4$ because the quantity of free buffers exceeds the predetermined value D and there are enough free HPB buffers that the memory system or host system may keep currently activated regions active for longer before the maximum quantity of regions that may concurrently support HPB is achieved. In other examples, when the current HPB hit count does not satisfy the predetermined value X, the memory system or host system may utilize a process similar to block 440 to determine deactivation thresholds DT$_8$, DT$_{12}$, DT$_{13}$, or DT$_{14}$. In some examples, deactivation thresholds DT$_8$, DT$_{12}$, DT$_{13}$, or D$_{T14}$ may be greater than respective deactivation thresholds DT$_1$, DT$_5$, DT$_6$, or DT$_7$ as the quantity of free buffers exceeds the predetermined value D. Although the values HPB$_1$, HPB$_2$, HPB$_3$, HPB$_4$ are shown as the same for activation and deactivation, different values for determining activation and deactivation thresholds may be used, in some cases.

Alternatively, the memory system or host system may determine the deactivation threshold for a given region using a formula in place of flow diagram 400. In some examples, the memory system or host system may determine the deactivation threshold by utilizing the following formula; DT$_n$=A*(1+8/2$^{Last\ Miss\ Count/Last\ Hit\ Count}$)−DirtyRatio+log$_2$(HitRatioLast1024/LastHitRatio)+log$_e$ B/(cardDensity−MaxActiveRegionSize), where A is the HPB sub region size (e.g., sub-region 210 as described with reference to FIG. 2) and B is the HPB free buffer count (e.g., the quantity of regions available to activate). In some examples, the value A may also be the minimum activation threshold. In some cases, the last hit count, last miss count, card density, and maximum active region size may be the same as the last hit count, last miss count, card density, and maximum active region size as discussed with reference to FIG. 3. In some examples, the dirty ratio may be equal to the LastLBAUpdateCount/HPBSubRegionLBACount. The last LBA update count may be the count of LBAs that are modified in a given region due to a write command, map command, or garbage collection operation (e.g., the count value of the second counter). The HPB sub-region LBA count may be the total quantity of LBAs in a given sub-region. Thus, the dirty ratio value may approach one (1) as more LBAs are updated in a given region. In examples where the host system determines the deactivation thresholds, the host system may request the count value of the second counter. The hitratiolast1024 may be the HPB hit ratio determined over the last 1024 HPB reads. That is, a HPB hit ratio may be determined when the memory system observes 1024 read commands serviced using HPB. For example, a memory system may observe 1024 HPB reads and 500 normal reads, the hitratiolast1024 may be 1024/(1024+500). In some examples, the memory system may reset the HPB read count when the value reaches 1024. The last hit ratio may be last HPB hit ratio as described with reference to FIG. 3. In cases where the hitratiolast1024 is greater than the last hit ratio, it may indicate the HPB hit ratio is increasing and the host system or memory system may accordingly determine a higher deactivation threshold.

Figure 5:
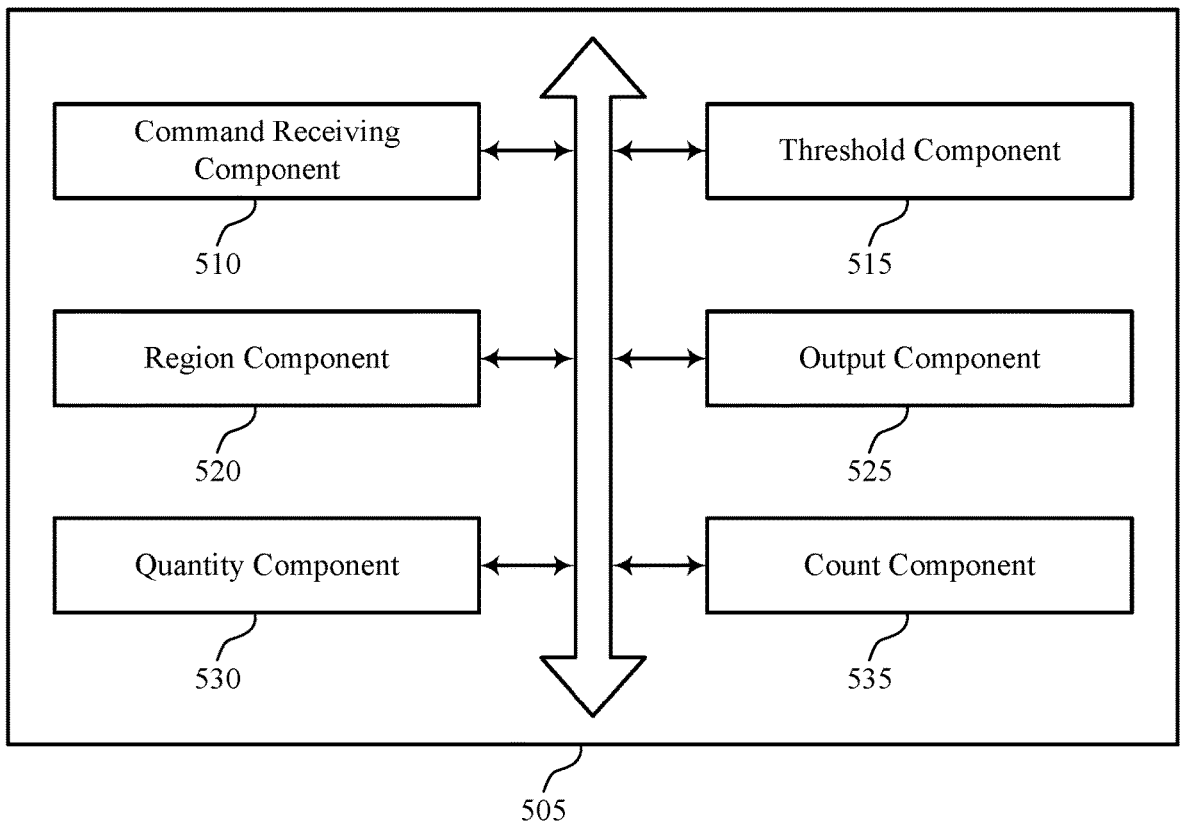
FIG. 5 shows a block diagram of a memory system that supports dynamically tuning host performance booster thresholds in accordance with examples as disclosed herein.

FIG. 5 shows a block diagram 500 of a memory system 505 that supports dynamically tuning host performance booster thresholds in accordance with examples as disclosed herein. The memory system 505 may be an example of aspects of a memory system as described with reference to FIGS. 1-4. The memory system 505 may include a command receiving component 510, a threshold component 515, a region component 520, an output component 525, a quantity component 530, and a count component 535. Each of these modules may communicate, directly or indirectly, with one another (e.g., via one or more buses).

The command receiving component 510 may receive a first set of commands associated with the region based on determining the region. In some examples, the command receiving component 510 may receive a second set of commands associated with the region. In some cases, the command receiving component 510 may receive a third set of commands activated for the first command mode according to a first address table.

The threshold component 515 may determine, upon deactivating the region from the second command mode, a first threshold for the region based on determining, for the first set of commands, a first quantity of read commands serviced according to the second command mode based on receiving the first set of commands. In some examples, the threshold component 515 may determine a second threshold for the region based on determining the third quantity of read commands and the fourth quantity of read commands.

In some cases, the threshold component 515 may determine a ratio of the quantity of blocks of the logical address space for the region that have physical memory addresses updated from the first address table and the total quantity of blocks in the logical address space, where the second threshold is based on the ratio. In some instances, the threshold component 515 may determine a ratio for the third quantity of read commands and the total of the third quantity of read commands and the fourth quantity of read commands, where the second threshold is based on determining the ratio. In some cases, the threshold component 515 may determine a ratio for the fifth quantity of read commands and the total quantity, where the second threshold is based on the ratio. In some examples, the threshold component 515 may determine a quantity of regions in the set of regions activated for the second command mode, where the second threshold is based on determining the total quantity of regions and the quantity of regions.

In some instances, the threshold component 515 may determine a ratio of the first quantity of read commands and a total quantity of the first quantity of read commands and the third quantity of read commands, where the first threshold is based on the ratio. In some examples, the threshold component 515 may determine a quantity of regions in the set of regions activated for the second command mode, where the first threshold is based on the total quantity of regions and the quantity of regions activated for the second command mode. In some cases, the threshold component 515 may determine an average of quantities of times each region in the set of regions is activated for the second command mode, where the first threshold is based on determining the quantity and the average. In some instances, the threshold component 515 may determine an average of quantities of read commands received at each region in the set of regions activated for the second command mode, where the first threshold is based on the quantity and the average.

The region component 520 may determine a region of a set of regions in a memory system activated for a first command mode, the memory system including memory addressable according to physical memory addresses, where the memory system receives commands according to the first command mode associated with a logical address space of the memory system including the set of regions and a second command mode associated with the physical memory addresses. In some examples, the region component 520 may activate the region for the second command mode based on a second quantity of read commands of the second set of commands exceeding the first threshold. In some instances, the region component 520 may deactivate the region for the first command mode based on determining the quantity of blocks satisfies the first threshold. In some cases, the region component 520 may update the quantity of regions activated for the second command mode to a second quantity based on deactivating the region for the second command mode. In some examples, the region component 520 may update the quantity of regions activated for the second command mode based on activating the region for the second command mode.

The output component 525 may output a memory address table associated with the region based on activating the region for the first command mode.

The quantity component 530 may determine a quantity of blocks of the logical address space for the region that have physical memory addresses updated from the first address table. In some examples, the quantity component 530 may determine a total quantity of blocks in the logical address space. In some instances, the quantity component 530 may determine a total of the third quantity of read commands and the fourth quantity of read commands. In some cases, the quantity component 530 may determine a total quantity of the third quantity of read commands and the fourth quantity of read commands subsequent to the fourth quantity of read commands satisfying a third threshold. In some examples, the quantity component 530 may determine a fifth quantity of read commands serviced according to the second command mode after the fourth quantity of read commands satisfies the third threshold. In some instances, the quantity component 530 may determine a total quantity of regions in the set of regions that are configured to be concurrently activated for the second command mode.

In some cases, the quantity component 530 may determine, for the first set of commands, a third quantity of read commands serviced according to the second command mode. In some examples, the quantity component 530 may determine a total quantity of regions in the set of regions that are configured to be concurrently activated for the second command mode. In some instances, the quantity component 530 may determine a quantity of read commands from the first set of commands that are executed at a physical memory address location different than a physical memory address received associated with the read commands, where the first threshold is based on determining the quantity of read commands. In some cases, the quantity component 530 may determine a quantity of times the region is activated for the second command mode. In some examples, the quantity component 530 may determine a quantity of read commands received in the first set of commands, where the quantity is reset upon deactivating the region from the second command mode.

The count component 535 may determine, for the third set of commands, a third quantity of read commands serviced according to the first command mode and a fourth quantity of read commands serviced according to the second command mode.

Figure 6:
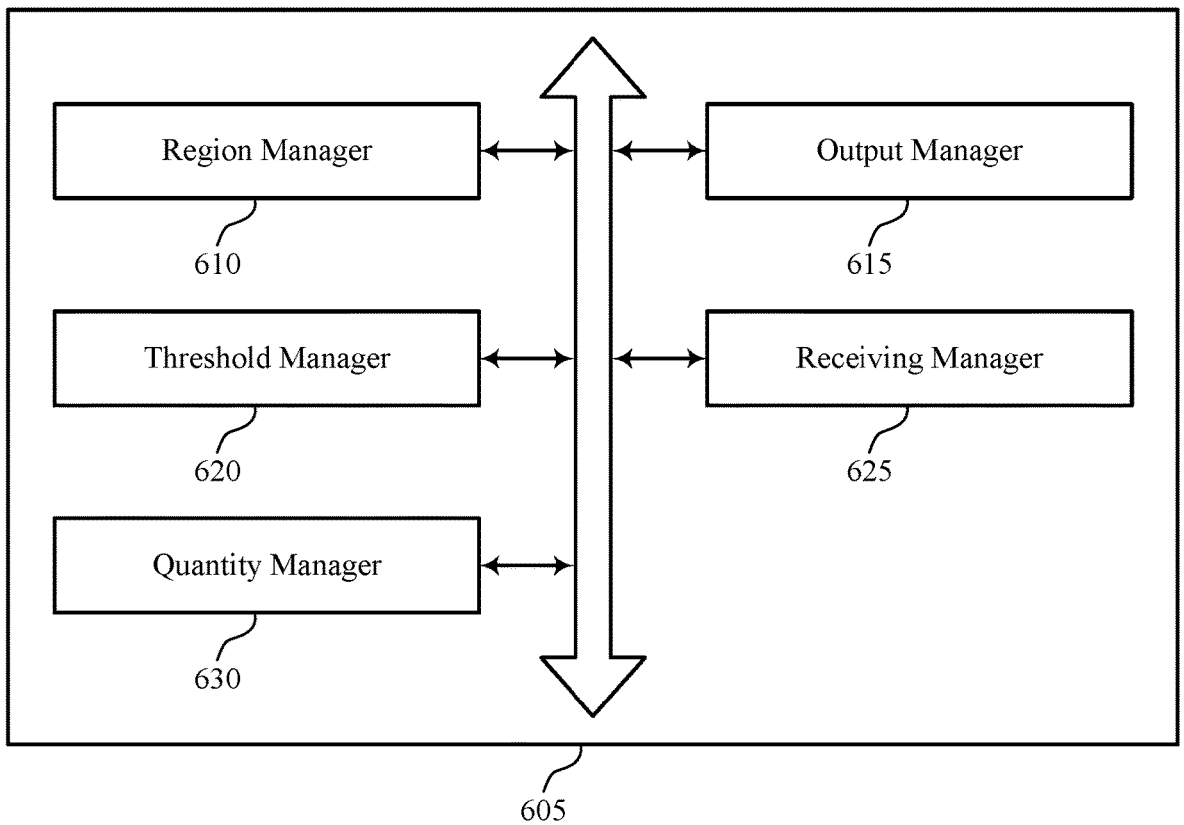
FIG. 6 shows a block diagram of a host system that supports dynamically tuning host performance booster thresholds in accordance with examples as disclosed herein.

FIG. 6 shows a block diagram 600 of a host system 605 that supports dynamically tuning host performance booster thresholds in accordance with examples as disclosed herein. The host system 605 may be an example of aspects of a host system as described with reference to FIGS. 1-4. The host system 605 may include a region manager 610, an output manager 615, a threshold manager 620, a receiving manager 625, and a quantity manager 630. Each of these modules may communicate, directly or indirectly, with one another (e.g., via one or more buses).

The region manager 610 may determine a region of a set of regions in a memory system activated for a first command mode, the memory system including memory addressable according to physical memory addresses, where the host system transmits commands according to a second command mode associated with a logical address space of the memory system including the set of regions and the first command mode associated with the physical memory addresses. In some examples, the region manager 610 may activate the region for the first command mode based on a second quantity of read commands of the second set of commands exceeding the first threshold. In some instances, the region manager 610 may deactivate the region for the first command mode based on determining the quantity of blocks satisfies the first threshold. In some cases, the region manager 610 may update the quantity of regions activated for the second command mode to a second quantity based on deactivating the region for the second command mode. In some examples, the region manager 610 may update the quantity of regions activated for the second command mode based on activating the region for the second command mode.

The output manager 615 may transmit a first set of commands associated with the region based on determining the region. In some examples, the output manager 615 may transmit a second set of commands associated with the region. In some cases, the output manager 615 may output, to the memory system, a command associated with a memory address table of the region based on activating the region for the first command mode. In some instances, the output manager 615 may transmit a third set of commands activated for the first command mode according to a first address table.

The threshold manager 620 may determine, upon deactivating the region from the first command mode, a first threshold for the region based on determining, for the first set of commands, a first quantity of read commands serviced according to the first command mode based on receiving the first set of commands. In some examples, the threshold manager 620 may determine a second threshold for the region based on receiving the third quantity of read commands and the fourth quantity of read commands. In some cases, the threshold manager 620 may determine a ratio for the third quantity of read commands and the total of the third quantity of read commands and the fourth quantity of read commands, where the second threshold is based on determining the ratio. In some instances, the threshold manager 620 may determine a ratio for the fifth quantity of read commands and the total quantity, where the second threshold is based on the ratio. In some examples, the threshold manager 620 may determine a quantity of regions in the set of regions activated for the second command mode, where the second threshold is based on determining the total quantity of regions and the quantity of regions. In some cases, the threshold manager 620 may determine a ratio of the first quantity of read commands and a total quantity of the first quantity of read commands and the third quantity of read commands, where the first threshold is based on the ratio.

In some instances, the threshold manager 620 may determine a quantity of regions in the set of regions activated for the second command mode, where the first threshold is based on the total quantity of regions and the quantity of regions activated for the second command mode. In some examples, the threshold manager 620 may determine an average of quantities of times each region in the set of regions is activated for the second command mode, where the first threshold is based on determining the quantity and the average. In some instances, the threshold manager 620 may determine an average of quantities of read commands received at each region in the set of regions activated for the second command mode, where the first threshold is based on the quantity and the average.

The receiving manager 625 may receive, from the memory system, the memory address table associated with the region based on outputting the command. In some examples, the receiving manager 625 may receive from the memory system, for the third set of commands, a third quantity of read commands serviced according to the first command mode and a fourth quantity of read commands serviced according to the second command mode. In some cases, the receiving manager 625 may receive an indication from the memory system of a quantity of blocks of the logical address space for the region that have physical memory addresses updated from the first address table. In some instances, the receiving manager 625 may receive an indication from the memory system of a ratio of the quantity of blocks of the logical address space for the region that have physical memory addresses updated from the first address table and the total quantity of blocks in the logical address space, where the second threshold is based on the ratio. In some examples, the receiving manager 625 may receive an indication from the memory system of a fifth quantity of read commands serviced according to the second command mode after the fourth quantity of read commands satisfies the third threshold. In some instances, the receiving manager 625 may receive from the memory system, for the first set of commands, a third quantity of read commands serviced according to the second command mode.

In some cases, the receiving manager 625 may receive an indication from the memory system of a quantity of read commands from the first set of commands that are executed at a physical memory address location different than a physical memory address received associated with the read commands, where the first threshold is based on determining the quantity of read commands.

The quantity manager 630 may determine a total quantity of blocks in the logical address space. In some examples, the quantity manager 630 may determine a total of the third quantity of read commands and the fourth quantity of read commands. In some instances, the quantity manager 630 may determine a total quantity of the third quantity of read commands and the fourth quantity of read commands subsequent to the fourth quantity of read commands satisfying a third threshold. In some cases, the quantity manager 630 may determine a total quantity of regions in the set of regions that are configured to be concurrently activated for the second command mode. In some examples, the quantity manager 630 may determine a total quantity of regions in the set of regions that are configured to be concurrently activated for the second command mode. In some cases, the quantity manager 630 may determine a quantity of times the region is activated for the second command mode. In some instances, the quantity manager 630 may determine a quantity of read commands received in the first set of commands, where the quantity is reset upon deactivating the region from the second command mode.

Figure 7:
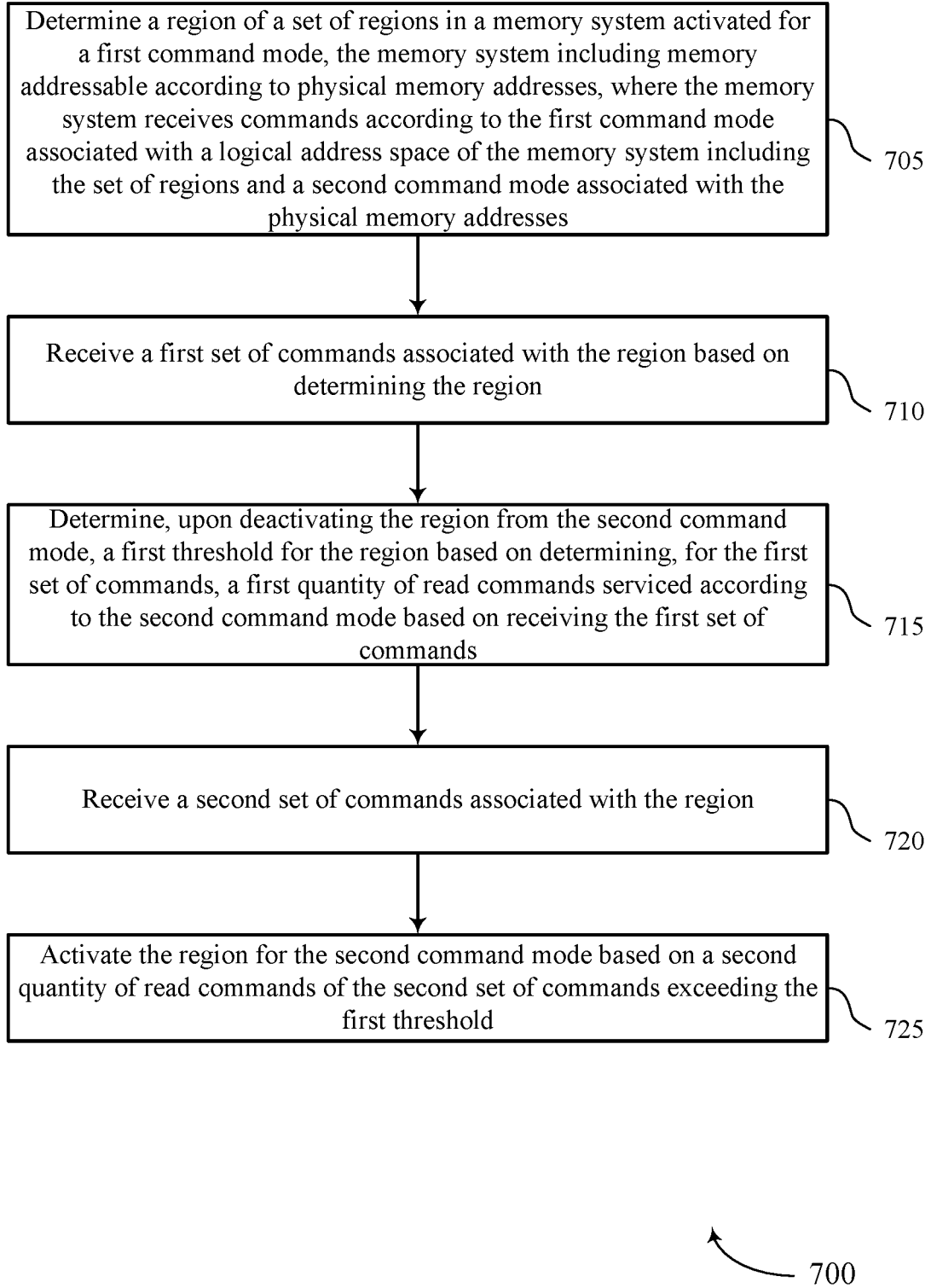
FIGS. 7 and 8 show flowcharts illustrating a method or methods that support dynamically tuning host performance booster thresholds in accordance with examples as disclosed herein.

FIG. 7 shows a flowchart illustrating a method or methods 700 that supports dynamically tuning host performance booster thresholds in accordance with aspects of the present disclosure. The operations of method 700 may be implemented by a memory system or its components as described herein. For example, the operations of method 700 may be performed by a memory system as described with reference to FIG. 5. In some examples, a memory system may execute a set of instructions to control the functional elements of the memory system to perform the described functions. Additionally or alternatively, a memory system may perform aspects of the described functions using special-purpose hardware.

At 705, the memory system may determine a region of a set of regions in a memory system activated for a first command mode, the memory system including memory addressable according to physical memory addresses, where the memory system receives commands according to the first command mode associated with a logical address space of the memory system including the set of regions and a second command mode associated with the physical memory addresses. The operations of 705 may be performed according to the methods described herein. In some examples, aspects of the operations of 705 may be performed by a region component as described with reference to FIG. 5.

At 710, the memory system may receive a first set of commands associated with the region based on determining the region. The operations of 710 may be performed according to the methods described herein. In some examples, aspects of the operations of 710 may be performed by a command receiving component as described with reference to FIG. 5.

At 715, the memory system may determine, upon deactivating the region from the second command mode, a first threshold for the region based on determining, for the first set of commands, a first quantity of read commands serviced according to the second command mode based on receiving the first set of commands. The operations of 715 may be performed according to the methods described herein. In some examples, aspects of the operations of 715 may be performed by a threshold component as described with reference to FIG. 5.

At 720, the memory system may receive a second set of commands associated with the region. The operations of 720 may be performed according to the methods described herein. In some examples, aspects of the operations of 720 may be performed by a command receiving component as described with reference to FIG. 5.

At 725, the memory system may activate the region for the second command mode based on a second quantity of read commands of the second set of commands exceeding the first threshold. The operations of 725 may be performed according to the methods described herein. In some examples, aspects of the operations of 725 may be performed by a region component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for determining a region of a set of regions in a memory system activated for a first command mode, the memory system including memory addressable according to physical memory addresses, where the memory system receives commands according to the first command mode associated with a logical address space of the memory system including the set of regions and a second command mode associated with the physical memory addresses, receiving a first set of commands associated with the region based on determining the region, determining, upon deactivating the region from the second command mode, a first threshold for the region based on determining, for the first set of commands, a first quantity of read commands serviced according to the second command mode based on receiving the first set of commands, receiving a second set of commands associated with the region, and activating the region for the second command mode based on a second quantity of read commands of the second set of commands exceeding the first threshold.

Some examples of the method 700 and the apparatus described herein may further include operations, features, means, or instructions for outputting a memory address table associated with the region based on activating the region for the first command mode.

Some examples of the method 700 and the apparatus described herein may further include operations, features, means, or instructions for receiving a third set of commands activated for the first command mode according to a first address table, determining, for the third set of commands, a third quantity of read commands serviced according to the first command mode and a fourth quantity of read commands serviced according to the second command mode, determining a second threshold for the region based on determining the third quantity of read commands and the fourth quantity of read commands, determining a quantity of blocks of the logical address space for the region that may have physical memory addresses updated from the first address table, and deactivating the region for the first command mode based on determining the quantity of blocks satisfies the first threshold.

Some examples of the method 700 and the apparatus described herein may further include operations, features, means, or instructions for determining a total quantity of blocks in the logical address space, and determining a ratio of the quantity of blocks of the logical address space for the region that may have physical memory addresses updated from the first address table and the total quantity of blocks in the logical address space, where the second threshold may be based on the ratio.

Some examples of the method 700 and the apparatus described herein may further include operations, features, means, or instructions for determining a total of the third quantity of read commands and the fourth quantity of read commands, and determine a ratio for the third quantity of read commands and the total of the third quantity of read commands and the fourth quantity of read commands, where the second threshold may be based on determining the ratio.

Some examples of the method 700 and the apparatus described herein may further include operations, features, means, or instructions for determining a total quantity of the third quantity of read commands and the fourth quantity of read commands subsequent to the fourth quantity of read commands satisfying a third threshold, determining a fifth quantity of read commands serviced according to the second command mode after the fourth quantity of read commands satisfies the third threshold, and determining a ratio for the fifth quantity of read commands and the total quantity, where the second threshold may be based on the ratio.

Some examples of the method 700 and the apparatus described herein may further include operations, features, means, or instructions for determining a total quantity of regions in the set of regions that may be configured to be concurrently activated for the second command mode, and determining a quantity of regions in the set of regions activated for the second command mode, where the second threshold may be based on determining the total quantity of regions and the quantity of regions.

Some examples of the method 700 and the apparatus described herein may further include operations, features, means, or instructions for updating the quantity of regions activated for the second command mode to a second quantity based on deactivating the region for the second command mode.

In some examples of the method 700 and the apparatus described herein, determining the first threshold further may include operations, features, means, or instructions for determining, for the first set of commands, a third quantity of read commands serviced according to the second command mode, and determining a ratio of the first quantity of read commands and a total quantity of the first quantity of read commands and the third quantity of read commands, where the first threshold may be based on the ratio.

In some examples of the method 700 and the apparatus described herein, determining the first threshold further may include operations, features, means, or instructions for determining a total quantity of regions in the set of regions that may be configured to be concurrently activated for the second command mode, and determining a quantity of regions in the set of regions activated for the second command mode, where the first threshold may be based on the total quantity of regions and the quantity of regions activated for the second command mode.

Some examples of the method 700 and the apparatus described herein may further include operations, features, means, or instructions for updating the quantity of regions activated for the second command mode based on activating the region for the second command mode.

Some examples of the method 700 and the apparatus described herein may further include operations, features, means, or instructions for determining a quantity of read commands from the first set of commands that may be executed at a physical memory address location different than a physical memory address received associated with the read commands, where the first threshold may be based on determining the quantity of read commands.

Some examples of the method 700 and the apparatus described herein may further include operations, features, means, or instructions for determining a quantity of times the region may be activated for the second command mode, and determining an average of quantities of times each region in the set of regions may be activated for the second command mode, where the first threshold may be based on determining the quantity and the average.

Some examples of the method 700 and the apparatus described herein may further include operations, features, means, or instructions for determining a quantity of read commands received in the first set of commands, where the quantity may be reset upon deactivating the region from the second command mode, and determining an average of quantities of read commands received at each region in the set of regions activated for the second command mode, where the first threshold may be based on the quantity and the average.

Figure 8:
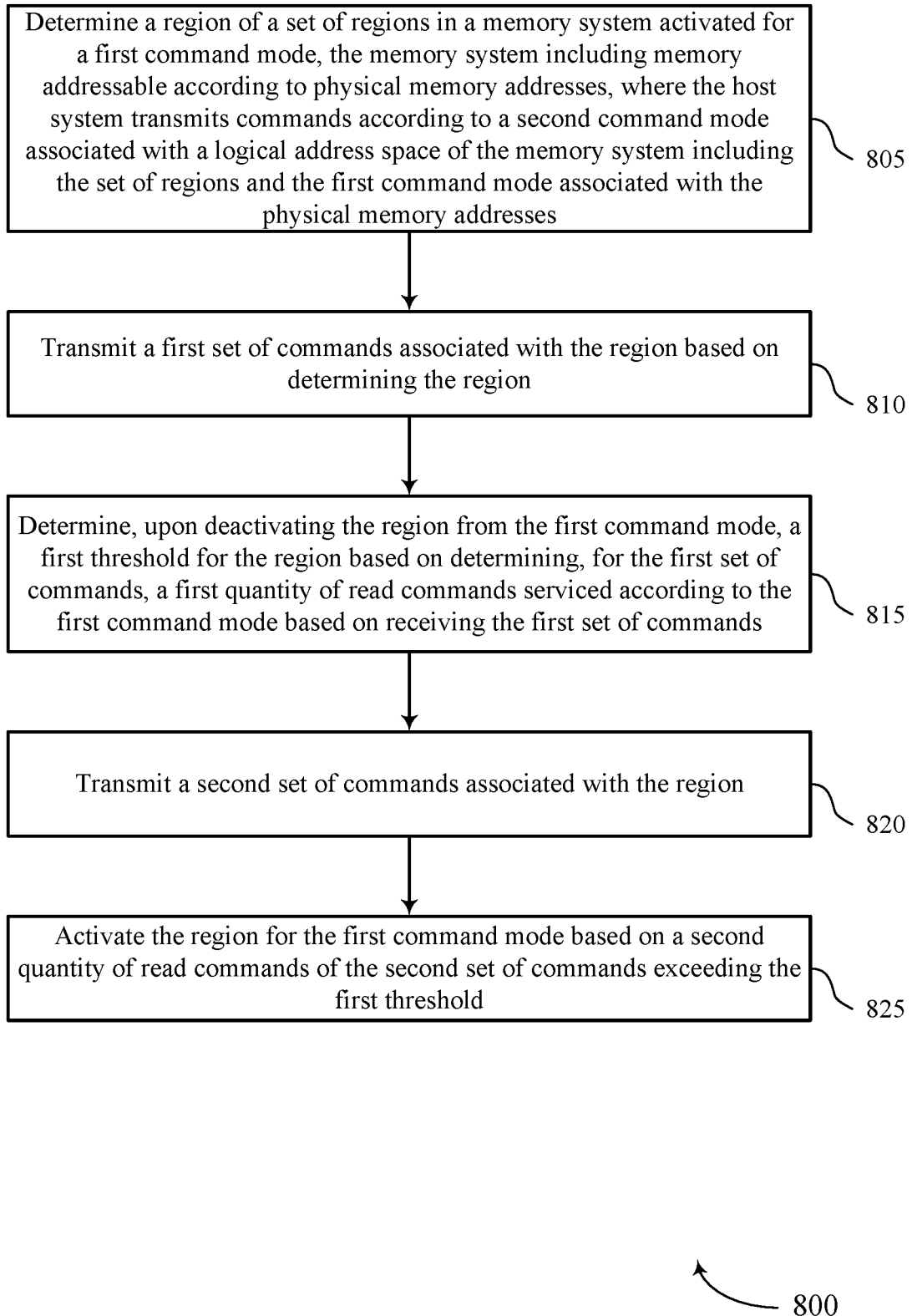

FIG. 8 shows a flowchart illustrating a method or methods 800 that supports dynamically tuning host performance booster thresholds in accordance with aspects of the present disclosure. The operations of method 800 may be implemented by a host system or its components as described herein. For example, the operations of method 800 may be performed by a host system as described with reference to FIG. 6. In some examples, a host system may execute a set of instructions to control the functional elements of the host system to perform the described functions. Additionally or alternatively, a host system may perform aspects of the described functions using special-purpose hardware.

At 805, the host system may determine a region of a set of regions in a memory system activated for a first command mode, the memory system including memory addressable according to physical memory addresses, where the host system transmits commands according to a second command mode associated with a logical address space of the memory system including the set of regions and the first command mode associated with the physical memory addresses. The operations of 805 may be performed according to the methods described herein. In some examples, aspects of the operations of 805 may be performed by a region manager as described with reference to FIG. 6.

At 810, the host system may transmit a first set of commands associated with the region based on determining the region. The operations of 810 may be performed according to the methods described herein. In some examples, aspects of the operations of 810 may be performed by an output manager as described with reference to FIG. 6.

At 815, the host system may determine, upon deactivating the region from the first command mode, a first threshold for the region based on determining, for the first set of commands, a first quantity of read commands serviced according to the first command mode based on receiving the first set of commands. The operations of 815 may be performed according to the methods described herein. In some examples, aspects of the operations of 815 may be performed by a threshold manager as described with reference to FIG. 6.

At 820, the host system may transmit a second set of commands associated with the region. The operations of 820 may be performed according to the methods described herein. In some examples, aspects of the operations of 820 may be performed by an output manager as described with reference to FIG. 6.

At 825, the host system may activate the region for the first command mode based on a second quantity of read commands of the second set of commands exceeding the first threshold. The operations of 825 may be performed according to the methods described herein. In some examples, aspects of the operations of 825 may be performed by a region manager as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for determining a region of a set of regions in a memory system activated for a first command mode, the memory system including memory addressable according to physical memory addresses, where the host system transmits commands according to a second command mode associated with a logical address space of the memory system including the set of regions and the first command mode associated with the physical memory addresses, transmitting a first set of commands associated with the region based on determining the region, determining, upon deactivating the region from the first command mode, a first threshold for the region based on determining, for the first set of commands, a first quantity of read commands serviced according to the first command mode based on receiving the first set of commands, transmitting a second set of commands associated with the region, and activating the region for the first command mode based on a second quantity of read commands of the second set of commands exceeding the first threshold.

Some examples of the method 800 and the apparatus described herein may further include operations, features, means, or instructions for outputting, to the memory system, a command associated with a memory address table of the region based on activating the region for the first command mode, and receiving, from the memory system, the memory address table associated with the region based on outputting the command.

Some examples of the method 800 and the apparatus described herein may further include operations, features, means, or instructions for transmitting a third set of commands activated for the first command mode according to a first address table, receive from the memory system, for the third set of commands, a third quantity of read commands serviced according to the first command mode and a fourth quantity of read commands serviced according to the second command mode, determining a second threshold for the region based on receiving the third quantity of read commands and the fourth quantity of read commands, receive an indication from the memory system of a quantity of blocks of the logical address space for the region that may have physical memory addresses updated from the first address table, and deactivating the region for the first command mode based on determining the quantity of blocks satisfies the first threshold.

Some examples of the method 800 and the apparatus described herein may further include operations, features, means, or instructions for determining a total quantity of blocks in the logical address space, and receive an indication from the memory system of a ratio of the quantity of blocks of the logical address space for the region that may have physical memory addresses updated from the first address table and the total quantity of blocks in the logical address space, where the second threshold may be based on the ratio.

Some examples of the method 800 and the apparatus described herein may further include operations, features, means, or instructions for determining a total of the third quantity of read commands and the fourth quantity of read commands, and determining a ratio for the third quantity of read commands and the total of the third quantity of read commands and the fourth quantity of read commands, where the second threshold may be based on determining the ratio.

Some examples of the method 800 and the apparatus described herein may further include operations, features, means, or instructions for determining a total quantity of the third quantity of read commands and the fourth quantity of read commands subsequent to the fourth quantity of read commands satisfying a third threshold, receiving an indication from the memory system of a fifth quantity of read commands serviced according to the second command mode after the fourth quantity of read commands satisfies the third threshold, and determining a ratio for the fifth quantity of read commands and the total quantity, where the second threshold may be based on the ratio.

Some examples of the method 800 and the apparatus described herein may further include operations, features, means, or instructions for determining a total quantity of regions in the set of regions that may be configured to be concurrently activated for the second command mode, and determining a quantity of regions in the set of regions activated for the second command mode, where the second threshold may be based on determining the total quantity of regions and the quantity of regions.

Some examples of the method 800 and the apparatus described herein may further include operations, features, means, or instructions for updating the quantity of regions activated for the second command mode to a second quantity based on deactivating the region for the second command mode.

In some examples of the method 800 and the apparatus described herein, determining the first threshold further may include operations, features, means, or instructions for receiving from the memory system, for the first set of commands, a third quantity of read commands serviced according to the second command mode, and determining a ratio of the first quantity of read commands and a total quantity of the first quantity of read commands and the third quantity of read commands, where the first threshold may be based on the ratio.

In some examples of the method 800 and the apparatus described herein, determining the first threshold further may include operations, features, means, or instructions for determining a total quantity of regions in the set of regions that may be configured to be concurrently activated for the second command mode, and determining a quantity of regions in the set of regions activated for the second command mode, where the first threshold may be based on the total quantity of regions and the quantity of regions activated for the second command mode.

Some examples of the method 800 and the apparatus described herein may further include operations, features, means, or instructions for updating the quantity of regions activated for the second command mode based on activating the region for the second command mode.

Some examples of the method 800 and the apparatus described herein may further include operations, features, means, or instructions for receiving an indication from the memory system of a quantity of read commands from the first set of commands that may be executed at a physical memory address location different than a physical memory address received associated with the read commands, where the first threshold may be based on determining the quantity of read commands.

Some examples of the method 800 and the apparatus described herein may further include operations, features, means, or instructions for determining a quantity of times the region may be activated for the second command mode, and determining an average of quantities of times each region in the set of regions may be activated for the second command mode, where the first threshold may be based on determining the quantity and the average.

Some examples of the method 800 and the apparatus described herein may further include operations, features, means, or instructions for determining a quantity of read commands received in the first set of commands, where the quantity may be reset upon deactivating the region from the second command mode, and determining an average of quantities of read commands received at each region in the set of regions activated for the second command mode, where the first threshold may be based on the quantity and the average.

It should be noted that the methods described above describe possible implementations, and that the operations and the steps may be rearranged or otherwise modified and that other implementations are possible. Further, portions from two or more of the methods may be combined.

An apparatus is described. The apparatus may include a set of memory systems including memory addressable according to physical memory addresses, an interface configured to be coupled with a host system and the set of memory devices, the interface configured to communicate commands with the host system according to a first command mode associated with a logical address space of the memory system, the logical address space including a set of regions, the interface further configured to communicate commands with the host system according to a second command mode for one or more of the set of regions, the second command mode associated with the physical memory addresses. The apparatus may further include a controller coupled with the interface and the memory system and configured to cause the memory system to, receive a first set of commands from the host system associated with the region, determine, upon deactivating the region from the second command mode, a first threshold for the region based on determining, for the first set of commands, a first quantity of read commands serviced according to the second command mode, receive a second set of commands from the host system associated with the region, and activate the region for the second command mode based on a second quantity of read commands of the second set of commands exceeding the first threshold.

In some cases, the controller may be further configured to output, to the host system, a memory address table associated with the region based on activating the region for the second command mode.

In some examples, the controller may be further configured to determine, for the first set of commands, a second quantity of read commands serviced according to the first command mode, and determine a ratio of the first quantity of read commands and a total quantity of the first quantity of read commands and the second quantity of read commands, where the controller may be configured to determine the first threshold based on determining the ratio.

In some instances, the controller may be further configured to determine a total quantity of regions in the set of regions that may be configured to be concurrently activated for the second command mode, and determine a quantity of regions in the set of regions activated for the second command mode, where the controller may be configured to determine the first threshold based on determining the total quantity of regions and the quantity of regions activated for the second command mode.

In some cases, the controller may be further configured to update the quantity of regions activated for the second command mode based on activating the region for the second command mode.

In some examples, the controller may be further configured to determine a quantity of read commands from the first set of commands that may be executed at a physical memory address location different than a physical memory address received associated with the read commands, where the controller may be configured to determine the first threshold based on determining the quantity of read commands.

In some instances, the controller may be further configured to determine a quantity of times the region may be activated for the second command mode, and determine an average of quantities of times each region in the set of regions may be activated for the second command mode, where the controller may be configured to determine the first threshold based on determining the quantity of times the region may be activated for the second command mode and the average of the quantities of times each region may be activated for the second command mode.

In some cases, the controller may be further configured to determine a quantity of read commands received in the first set of commands, where the quantity may be reset upon deactivating the region from the second command mode, and determine an average of quantities of read commands received at each region in the set of regions activated for the second command mode, where the controller may be configured to determine the first threshold based on determining the quantity of read commands and the average of the quantities of read commands.

An apparatus is described. The apparatus may include a set of memory devices, the set of memory devices including memory addressable according to physical memory addresses, an interface configured to be coupled with a host system and the set of memory devices, the interface configured to communicate commands with the host system according to a first command mode associated with a logical address space of the memory system, the logical address space including a set of regions, the interface further configured to communicate commands with the host system according to a second command mode for one or more of the set of regions, the second command mode associated with the physical memory addresses. The apparatus may further include a controller coupled with the interface and the memory system, where the controller is configured to cause the memory system to, receive a first set of commands from the host system associated with the region, determine a first threshold for the region based on determining, for the first set of commands, a first quantity of read commands serviced according to the first command mode and a second quantity of read commands serviced according to the second command mode, determine a quantity of blocks of the logical address space for the region that have physical memory addresses updated from the first address table, and deactivate the region for the second command mode based on determining the quantity of blocks satisfies the first threshold.

In some cases, the controller may be further configured to determine a total quantity of blocks in the logical address space, and determine a ratio of the quantity of blocks of the logical address space for the region that may have physical memory addresses updated from the first address table and the total quantity of blocks in the logical address space, where the controller may be configured to determine the first threshold based on the ratio.

In some examples, the controller may be further configured to determine a total quantity of regions in the set of regions that may be configured to be concurrently activated for the second command mode, and determine a quantity of regions in the set of regions activated for the second command mode, where the controller may be configured to determine the first threshold based on determining the total quantity of regions and the quantity of regions.

In some instances, the controller may be further configured to update the quantity of regions activated for the second command mode to a second quantity based on deactivating the region for the second command mode.

In some cases, the controller may be further configured to determine a total of the first quantity of read commands and the second quantity of read commands, and determine a ratio for the first quantity of read commands and the total of the first quantity of read commands and the second quantity of read commands, where the controller may be configured to determine the first threshold based on determining the ratio.

In some examples, the controller may be further configured to determine a total quantity of the first quantity of read commands and the second quantity of read commands subsequent to the second quantity of read commands satisfying a second threshold, determine a third quantity of read commands serviced according to the second command mode after the second quantity of read commands satisfies the second threshold, and determine a ratio for the third quantity of read commands and the total quantity, where the controller may be configured to determine the first threshold based on the ratio.

An apparatus is described. The apparatus may include an interface configured to be coupled with a memory system, the interface configured to communicate commands with the memory system according to a first command mode associated with a logical address space, the interface further configured to communicate commands with the memory system according to a second command mode for one or more of a set of regions of the logical address space, the second command mode associated with physical memory addresses of the memory system, a table store including a set of memory address tables associated with at least a subset of the set of regions. The apparatus may further include a host controller, where the host controller is further configured to cause the host system to, transmit a first set of commands associated with the region of the set of regions for the memory system, receive, for the first set of commands, a quantity of read commands serviced according to the second command mode based on receiving the first set of commands, determine, upon deactivating the region from the second command mode, a first threshold for the region based on receiving the quantity of read commands serviced according to the second command mode, generate a second set of commands associated with the region of the set of regions for the memory system, and activate the region for the second command mode based on a second quantity of read commands of the second set of commands satisfying the first threshold.

In some cases, the host controller may be further configured to output, to the memory system, a command associated with a memory address table of the region based on determining that a second quantity of read commands serviced according to the second command mode of the second set of commands satisfies the first threshold, and receive, from the memory system, the memory address table associated with the region based on outputting the command.

In some examples, the host controller may be further configured to generate a third set of commands for the region activated for the second command mode according to a first address table, determine, for the third set of commands, a third quantity of read commands serviced according to the first command mode and a fourth quantity of read commands serviced according to the second command mode, determine a second threshold for the region based on determining the third quantity of read commands and the fourth quantity of read commands, receive an indication from the memory system of a quantity of blocks of the logical address space for the region that may have physical memory addresses updated from the first address table, and deactivate the region for the second command mode based on determining the quantity of blocks satisfies the second threshold.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory system comprising:
   a set of memory devices comprising memory addressable according to physical memory addresses;
   an interface configured to be coupled with a host system and the set of memory devices, the interface configured to communicate commands with the host system according to a first command mode associated with a logical address space of the memory system, the logical address space comprising a plurality of regions, the interface further configured to communicate commands with the host system according to a second command mode for one or more of the plurality of regions, the second command mode associated with the physical memory addresses; and
   a controller coupled with the interface and the memory system and configured to cause the memory system to:
      determine a region of the plurality of regions activated for the second command mode;
      receive a first plurality of commands from the host system associated with the region;
      determine, upon deactivating the region from the second command mode, a first threshold for the region based at least in part on determining, for the first plurality of commands, a first quantity of read commands serviced according to the second command mode;
      receive a second plurality of commands from the host system associated with the region; and
      activate the region for the second command mode based at least in part on a second quantity of read commands of the second plurality of commands exceeding the first threshold.

2. The memory system of claim 1, wherein the controller is further configured to cause the memory system to:
   output, to the host system, a memory address table associated with the region based at least in part on activating the region for the second command mode.

3. The memory system of claim 1, wherein the controller is further configured to cause the memory system to:
   determine, for the first plurality of commands, a third quantity of read commands serviced according to the first command mode; and
   determine a ratio of the first quantity of read commands and a total quantity of the first quantity of read commands and the third quantity of read commands, wherein the controller is configured to determine the first threshold based at least in part on determining the ratio.

4. The memory system of claim 1, wherein the controller is further configured to cause the memory system to:
   determine a total quantity of regions in the plurality of regions that are configured to be concurrently activated for the second command mode; and
   determine a quantity of regions in the plurality of regions activated for the second command mode, wherein the controller is configured to determine the first threshold based at least in part on determining the total quantity of regions and the quantity of regions activated for the second command mode.

5. The memory system of claim 4, wherein the controller is further configured to cause the memory system to:
   update the quantity of regions activated for the second command mode based at least in part on activating the region for the second command mode.

6. The memory system of claim 1, wherein the controller is further configured to cause the memory system to:
   determine a quantity of read commands from the first plurality of commands that are executed at a physical memory address location different than a physical memory address received associated with the read commands, wherein the controller is configured to determine the first threshold based at least in part on determining the quantity of read commands.

7. The memory system of claim 1, wherein the controller is further configured to cause the memory system to:
   determine a quantity of times the region is activated for the second command mode; and
   determine an average of quantities of times each region in the plurality of regions is activated for the second command mode, wherein the controller is configured to determine the first threshold based at least in part on determining the quantity of times the region is activated for the second command mode and the average of the quantities of times each region is activated for the second command mode.

8. The memory system of claim 1, wherein the controller is further configured to cause the memory system to:
   determine a quantity of read commands received in the first plurality of commands, wherein the quantity is reset upon deactivating the region from the second command mode; and
   determine an average of quantities of read commands received at each region in the plurality of regions activated for the second command mode, wherein the controller is configured to determine the first threshold based at least in part on determining the quantity of read commands and the average of the quantities of read commands.

9. A memory system comprising:
- a set of memory devices, the set of memory devices comprising memory addressable according to physical memory addresses;
- an interface configured to be coupled with a host system and the set of memory devices, the interface configured to communicate commands with the host system according to a first command mode associated with a logical address space of the memory system, the logical address space comprising a plurality of regions, the interface further configured to communicate commands with the host system according to a second command mode for one or more of the plurality of regions, the second command mode associated with the physical memory addresses; and
- a controller coupled with the interface and the memory system, wherein the controller is configured to cause the memory system to:
  - determine a region of the plurality of regions activated for the second command mode according to a first address table;
  - receive a first plurality of commands from the host system associated with the region;
  - determine a first threshold for the region based at least in part on determining, for the first plurality of commands, a first quantity of read commands serviced according to the first command mode and a second quantity of read commands serviced according to the second command mode;
  - determine a quantity of blocks of the logical address space for the region that have physical memory addresses updated from the first address table; and
  - deactivate the region for the second command mode based at least in part on determining the quantity of blocks satisfies the first threshold.

10. The memory system of claim 9, wherein the controller is further configured to cause the memory system to:
- determine a total quantity of blocks in the logical address space; and
- determine a ratio of the quantity of blocks of the logical address space for the region that have physical memory addresses updated from the first address table and the total quantity of blocks in the logical address space, wherein the controller is configured to determine the first threshold based at least in part on the ratio.

11. The memory system of claim 9, wherein the controller is further configured to cause the memory system to:
- determine a total quantity of regions in the plurality of regions that are configured to be concurrently activated for the second command mode; and
- determine a quantity of regions in the plurality of regions activated for the second command mode, wherein the controller is configured to determine the first threshold based at least in part on determining the total quantity of regions and the quantity of regions.

12. The memory system of claim 11, wherein the controller is further configured to cause the memory system to:
- update the quantity of regions activated for the second command mode to a second quantity based at least in part on deactivating the region for the second command mode.

13. The memory system of claim 9, wherein the controller is further configured to cause the memory system to:
- determine a total of the first quantity of read commands and the second quantity of read commands; and
- determine a ratio for the first quantity of read commands and the total of the first quantity of read commands and the second quantity of read commands, wherein the controller is configured to determine the first threshold based at least in part on determining the ratio.

14. The memory system of claim 9, wherein the controller is further configured to cause the memory system to:
- determine a total quantity of the first quantity of read commands and the second quantity of read commands subsequent to the second quantity of read commands satisfying a second threshold;
- determine a third quantity of read commands serviced according to the second command mode after the second quantity of read commands satisfies the second threshold; and
- determine a ratio for the third quantity of read commands and the total quantity, wherein the controller is configured to determine the first threshold based at least in part on the ratio.

15. A method performed by a memory system, the method comprising:
- determining a region of a plurality of regions in a memory system activated for a first command mode, the memory system comprising memory addressable according to physical memory addresses, wherein the memory system receives commands according to a second command mode associated with a logical address space of the memory system comprising the plurality of regions and a first command mode associated with the physical memory addresses;
- receiving a first plurality of commands associated with the region based at least in part on determining the region;
- determining, upon deactivating the region from the first command mode, a first threshold for the region based at least in part on determining, for the first plurality of commands, a first quantity of read commands serviced according to the first command mode based at least in part on receiving the first plurality of commands;
- receiving a second plurality of commands associated with the region; and
- activating the region for the first command mode based at least in part on a second quantity of read commands of the second plurality of commands exceeding the first threshold.

16. The method of claim 15, further comprising:
- outputting a memory address table associated with the region based at least in part on activating the region for the first command mode.

17. The method of claim 15, further comprising:
- receiving a third plurality of commands activated for the first command mode according to a first address table;
- determining, for the third plurality of commands, a third quantity of read commands serviced according to the first command mode and a fourth quantity of read commands serviced according to the second command mode;
- determining a second threshold for the region based at least in part on determining the third quantity of read commands and the fourth quantity of read commands;
- determining a quantity of blocks of the logical address space for the region that have physical memory addresses updated from the first address table; and deactivating the region for the first command mode based at least in part on determining the quantity of blocks satisfies the first threshold.

18. The method of claim 15, wherein determining the first threshold further comprises:
determining, for the first plurality of commands, a third quantity of read commands serviced according to the second command mode; and
determining a ratio of the first quantity of read commands and a total quantity of the first quantity of read commands and the third quantity of read commands, wherein the first threshold is based at least in part on the ratio.

19. The method of claim 15, wherein determining the first threshold further comprises:
determining a total quantity of regions in the plurality of regions that are configured to be concurrently activated for the second command mode; and
determining a quantity of regions in the plurality of regions activated for the second command mode, wherein the first threshold is based at least in part on the total quantity of regions and the quantity of regions activated for the second command mode.

20. The method of claim 19, further comprising:
updating the quantity of regions activated for the second command mode based at least in part on activating the region for the second command mode.

21. The method of claim 15, further comprising:
determining a quantity of times the region is activated for the second command mode; and
determining an average of quantities of times each region in the plurality of regions is activated for the second command mode, wherein the first threshold is based at least in part on determining the quantity and the average.

22. The method of claim 15, further comprising:
determining a quantity of read commands received in the first plurality of commands, wherein the quantity is reset upon deactivating the region from the second command mode; and
determining an average of quantities of read commands received at each region in the plurality of regions activated for the second command mode, wherein the first threshold is based at least in part on the quantity and the average.

23. A host system, comprising:
an interface configured to be coupled with a memory system, the interface configured to communicate commands with the memory system according to a first command mode associated with a logical address space, the interface further configured to communicate commands with the memory system according to a second command mode for one or more of a plurality of regions of the logical address space, the second command mode associated with physical memory addresses of the memory system;
a table store comprising a plurality of memory address tables associated with at least a subset of the plurality of regions; and
a host controller, wherein the host controller is further configured to cause the host system to:
determine a region of the plurality of regions activated for the second command mode;
transmit a first plurality of commands associated with the region of the plurality of regions for the memory system;
receive, for the first plurality of commands, a quantity of read commands serviced according to the second command mode based at least in part on receiving the first plurality of commands;
determine, upon deactivating the region from the second command mode, a first threshold for the region based at least in part on receiving the quantity of read commands serviced according to the second command mode;
transmit a second plurality of commands associated with the region of the plurality of regions for the memory system; and
activate the region for the second command mode based at least in part on a second quantity of read commands of the second plurality of commands satisfying the first threshold.

24. The host system of claim 23, wherein to activate the region for the second command mode, the host controller is further configured to cause the host system to:
output, to the memory system, a command associated with a memory address table of the region based at least in part on determining that a second quantity of read commands serviced according to the second command mode of the second plurality of commands satisfies the first threshold; and
receive, from the memory system, the memory address table associated with the region based at least in part on outputting the command.

25. The host system of claim 23, wherein the host controller is further configured to cause the host system to:
generate a third plurality of commands for the region activated for the second command mode according to a first address table;
determine, for the third plurality of commands, a third quantity of read commands serviced according to the first command mode and a fourth quantity of read commands serviced according to the second command mode;
determine a second threshold for the region based at least in part on determining the third quantity of read commands and the fourth quantity of read commands;
receive an indication from the memory system of a quantity of blocks of the logical address space for the region that have physical memory addresses updated from the first address table; and
deactivate the region for the second command mode based at least in part on determining the quantity of blocks satisfies the second threshold.

* * * * *